(12) United States Patent
Umeda et al.

(10) Patent No.: US 8,442,315 B2
(45) Date of Patent: May 14, 2013

(54) IMAGE PROCESSING APPARATUS, IMAGE PROCESSING METHOD, AND COMPUTER-READABLE MEDIUM

(75) Inventors: Kiyoshi Umeda, Kawasaki (JP); Hiroyuki Sakai, Chigasaki (JP); Junichi Nakagawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 225 days.

(21) Appl. No.: 12/962,875

(22) Filed: Dec. 8, 2010

(65) Prior Publication Data

US 2012/0013763 A1   Jan. 19, 2012

(30) Foreign Application Priority Data

Jul. 16, 2010  (JP) ................. 2010-162215

(51) Int. Cl.
*G06K 9/00*  (2006.01)
(52) U.S. Cl.
USPC ........................................ 382/167
(58) Field of Classification Search .......... 382/162–168, 382/190, 254, 274, 275; 358/1.9, 3.27, 516, 358/518–520, 523; 348/221.1, 223.1
See application file for complete search history.

(56) References Cited

U.S. PATENT DOCUMENTS

| | | | |
|---|---|---|---|
| 5,218,387 A | 6/1993 | Ueno et al. | |
| 5,905,807 A | 5/1999 | Kado et al. | |
| 6,069,981 A | 5/2000 | Murakami | |
| 6,603,885 B1 * | 8/2003 | Enomoto | 382/263 |
| 6,885,760 B2 | 4/2005 | Yamada et al. | |
| 6,895,103 B2 | 5/2005 | Chen et al. | |
| 6,961,149 B2 * | 11/2005 | Komiya et al. | 358/1.9 |
| 6,965,684 B2 | 11/2005 | Chen et al. | |
| 7,057,768 B2 | 6/2006 | Zaklika et al. | |
| 7,139,425 B2 | 11/2006 | Takahashi | |
| 7,570,809 B1 * | 8/2009 | Srinivasa | 382/167 |
| 7,932,928 B2 * | 4/2011 | Koizumi et al. | 348/222.1 |

(Continued)

FOREIGN PATENT DOCUMENTS

| | | |
|---|---|---|
| JP | 5-197793 | 8/1993 |
| JP | 8-63597 | 3/1996 |

(Continued)

OTHER PUBLICATIONS

U.S. Appl. No. 12/962,895, filed Dec. 8, 2010. Applicants: Junichi Nakagawa, et al.

(Continued)

*Primary Examiner* — Jose Couso
(74) *Attorney, Agent, or Firm* — Fitzpatrick, Cella, Harper & Scinto

(57) ABSTRACT

An image processing apparatus for applying a color balance correction to input image data, comprises a first highlight color calculation unit which estimates a light source at the time of shooting from pixel values of the image data, converts color values of the image data based on a condition of the estimated light source at the time of shooting, and calculates a first highlight color; a second highlight color calculation unit which calculates a second highlight color from the image data; a third highlight color calculation unit which calculates a third highlight color based on a positional relationship between the first highlight color and the second highlight color on a color space; and a correction unit which attains the color balance correction by converting the pixel values of the image data using the third highlight color.

21 Claims, 21 Drawing Sheets

U.S. PATENT DOCUMENTS

| | | | |
|---|---|---|---|
| 7,978,938 B1 * | 7/2011 | Wilensky | 382/311 |
| 8,213,733 B2 * | 7/2012 | Kato et al. | 382/254 |
| 2005/0286099 A1 | 12/2005 | Kameyama | |
| 2006/0066912 A1 | 3/2006 | Kagaya | |
| 2006/0078216 A1 | 4/2006 | Kaku | |
| 2007/0065006 A1 | 3/2007 | Wilensky | |
| 2009/0034838 A1 | 2/2009 | Umeda et al. | 382/167 |
| 2010/0295998 A1 | 11/2010 | Sakai et al. | 348/700 |

FOREIGN PATENT DOCUMENTS

| | | |
|---|---|---|
| JP | 8-77334 | 3/1996 |
| JP | 2541688 | 10/1996 |
| JP | 11-53525 | 2/1999 |
| JP | 11-250267 | 9/1999 |
| JP | 2000-105829 | 4/2000 |
| JP | 2000-132688 | 5/2000 |
| JP | 2000-235648 | 8/2000 |
| JP | 2001-216515 | 8/2001 |
| JP | 2002-152772 | 5/2002 |
| JP | 2002-183731 | 6/2002 |
| JP | 2003-30667 | 1/2003 |

OTHER PUBLICATIONS

U.S. Appl. No. 12/962,889, filed Dec. 8, 2010. Applicants: Hiroyuki Sakai, et al.
U.S. Appl. No. 12/962,868, filed Dec. 8, 2010, by Kiyoshi Umeda.
U.S. Appl. No. 12/966,265, filed Dec. 13, 2010 by Nobutaka Miyake.
U.S. Appl. No. 12/966,769, filed Dec. 13, 2010 by Tohru Ikeda.
U.S. Appl. No. 12/966,848, filed Dec. 13, 2010 by Senichi Saito.
U.S. Appl. No. 12/966,837, filed Dec. 13, 2010 by Mitsuhiro Ono.
Notice of Allowance for U.S. Appl. No. 12/962,895, filed Dec. 8, 2010 by Junichi Nakagawa.
Office Action for U.S. Appl. No. 12/962,889, filed Dec. 8, 2010 by Hiroyuki Sakai.

* cited by examiner

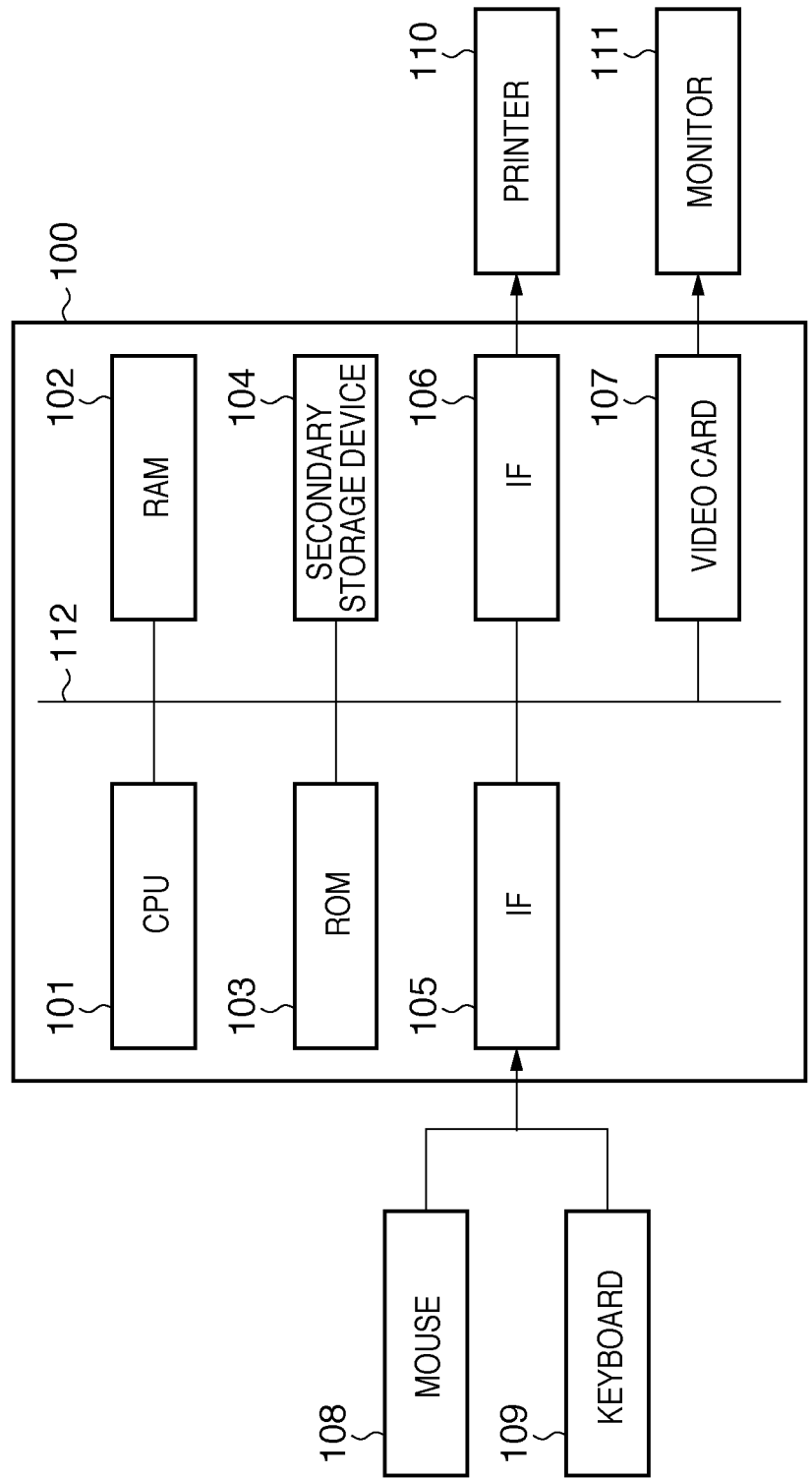

F I G. 13

| REFERENCE COLOR TEMPERATURE [K] | WHITE POINT YCbCr VALUES | | |
|---|---|---|---|
| | Y | Cb | Cr |
| 2000 | 255 | -30 | 30 |
| 5500 | 255 | 0 | 0 |
| 10000 | 255 | 20 | -20 |

IMAGE PROCESSING APPARATUS, IMAGE PROCESSING METHOD, AND COMPUTER-READABLE MEDIUM

BACKGROUND OF THE INVENTION

1. Field of the Invention

The present invention relates to an image processing apparatus, image processing method, and computer-readable medium which correct a color balance of input digital image data.

2. Description of the Related Art

Conventionally, a method of estimating a light source at the time of shooting of image data shot by a digital camera or that obtained by optically scanning a film shot by an analog camera, and applying a color balance correction to the image data has been proposed.

Japanese Patent Laid-Open No. 2002-152772 describes the following method. That is, a blackbody locus of gray and human skin color pixels based on a representative spectral distribution of a camera is held in advance. RGB components of respective pixels are multiplied by various coefficients so as to attain inverse conversions of a color balance correction of a camera, and the number of pixels after conversion, which are located adjacent to the blackbody locus, is evaluated, thereby estimating a light source at the time of shooting. After the light source is estimated, the converted image is converted into colors under a predetermined light source.

The aforementioned color balance correction method suffers the following problem. That is, the light source estimation result based on the technique described in the above conventional reference is not always correct. An example of this problem will be described below using the following two color balance correction examples.

The first color balance correction is a method described in Japanese Patent Laid-Open No. 2002-152772. A light source at the time of shooting of a target image is estimated based on a distribution of gray and skin color pixels, and a color balance correction is executed using a color temperature (unit: K (Kelvin)) of the light source based on the above estimation.

On the other hand, a conventional method of executing a color balance correction based on a color of a bright region (highlight color: HL color) of an image has been proposed. In this method, the bright region of an image basically corresponds to, for example, a white wall in a room or a white shirt, that is, an originally white object, and its color is likely to reflect the color of a light source at the time of shooting to some extent. For this reason, if the color of the bright region is an achromatic color, it can be judged that a color balance of an image is relatively proper. Conversely, if the color of the bright region is a chromatic color, it is judged that an arbitrary color fog has occurred, and the entire image is converted so that the HL color is approximate to an achromatic color.

A problem posed in this case is the relationship between two parameters used in the above two color balance corrections. If a color of a reference white point derived from the estimated light source color temperature is different from the HL color of an image, either of these parameters is likely to be wrong. Alternatively, both parameters may have errors.

For example, in the former color balance correction, the light source estimation is done using gray and skin color pixels of an image. However, since an image does not always include a skin color region, a wrong light source at the time of shooting may be estimated in this case.

In the latter color balance correction, for example, when an image of yellow flowers is shot in a macro mode, the HL color of an image is calculated from a yellow flower region. In this case, although an image originally has a proper color balance, it may be judged that the image has an improper color balance.

When the color balance correction is performed using either one of these parameters, the color balance of an image may be considerably broken. Even in such situations, it is required that a stable color balance correction is performed which suffers less extreme adverse image effects. However, the related arts have not proposed any effective solutions.

SUMMARY OF THE INVENTION

According to one aspect of the present invention, there is provided an image processing apparatus for applying a color balance correction to input image data, comprising: a first highlight color calculation unit which estimates a light source at the time of shooting from pixel values of the image data, converts color values of the image data based on a condition of the estimated light source at the time of shooting, and calculates a first highlight color; a second highlight color calculation unit which calculates a second highlight color from the image data; a third highlight color calculation unit which calculates a third highlight color based on a positional relationship between the first highlight color and the second highlight color on a color space; and a correction unit which attains the color balance correction by converting the pixel values of the image data using the third highlight color.

According to another aspect of the present invention, there is provided an image processing method for applying a color balance correction to input image data, comprising: a first highlight color calculation step of estimating a light source at the time of shooting from pixel values of the image data, converting color values of the image data based on a condition of the estimated light source at the time of shooting, and calculating a first highlight color; a second highlight color calculation step of calculating a second highlight color from the image data; a third highlight color calculation step of calculating a third highlight color based on a positional relationship between the first highlight color and the second highlight color on a color space; and a correction step of attaining the color balance correction by converting the pixel values of the image data using the third highlight color.

According to the present invention, even when a first highlight color calculated by a light source estimation is different from a second highlight color calculated from an image, a third highlight color can be calculated using both the colors. By applying a color balance correction using the third highlight color, even if one of these colors is wrong, a stable color balance correction which suppresses extreme adverse image effects can be performed.

Also, the present invention is particularly effective for nonlinear color balance correction using a highlight color. For example, when the color balance correction processing is nonlinear conversion processing, even when an image resulting from the nonlinear processing undergoes the aforementioned linear composition processing, the desired correction result cannot often be obtained. However, according to the present invention, since a color balance correction is performed after a reference white point is determined in advance, a desired output result can be obtained.

Further features of the present invention will become apparent from the following description of exemplary embodiments (with reference to the attached drawings).

BRIEF DESCRIPTION OF THE DRAWINGS

FIG. 1 is a block diagram showing the hardware arrangement required to execute an image processing method according to the present invention;

FIG. 13 is a table showing a holding example of white point information under respective light sources according to the present invention;

DESCRIPTION OF THE EMBODIMENTS

First Embodiment

Figure 2A:
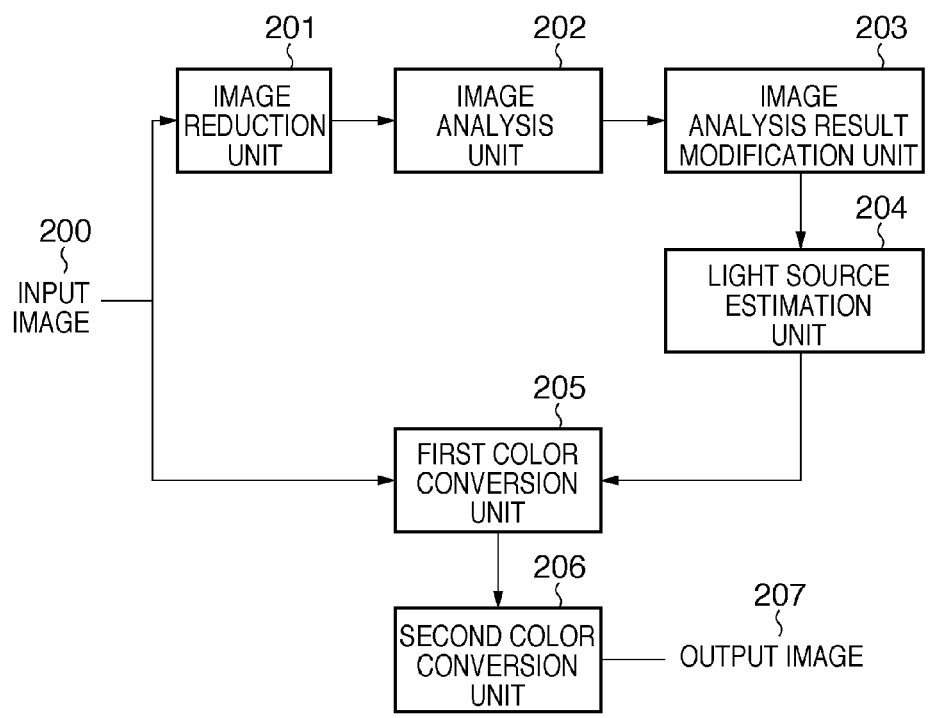
FIGS. 2A and 2B are functional block diagrams according to the first embodiment.

A first embodiment of the present invention will be described below. Note that the following description will be given under the assumption of image processing inside a printer main body. However, this is merely an embodiment, and the present invention is not limited to the following embodiments.

(Hardware Arrangement)

FIG. 1 shows the hardware arrangement which can implement an image processing method according to the present invention. Note that FIG. 1 shows an example in this embodiment, and the present invention is not limited to the arrangement shown in FIG. 1. Referring to FIG. 1, an image processing apparatus 100 has a CPU 101, RAM 102, and ROM 103, and respective functional blocks are connected to a system bus 112. Program codes that implement the operations of the present invention are stored in the ROM 103. These program codes are loaded onto the RAM 102 and are executed by the CPU 101 when the corresponding operations are performed.

The image processing apparatus 100 has a secondary storage device 104 such as an HDD or flash memory, and a mouse 108 and keyboard 109 are connected via an interface 105. Also, a printer 110 is connected via an interface 106, and a monitor 111 used to evaluate images before and after correction is connected via a video card 107.

The arrangement of the image processing apparatus shown in FIG. 1 is, for example, that of a PC (personal computer) as a general information processing apparatus.

[Overview of Overall Sequence]

The overall configuration of image processing according to the present invention will be described below with reference to FIG. 2A. In this embodiment, an input image 200 can be a digital image shot by a digital camera or that obtained by optically scanning a film shot using an analog camera. The format of input image data is not particularly limited as long as the present invention is applicable to the image data. In this embodiment, assume that a color space of an input image is sRGB (standard RGB) color space, and each pixel value is configured by 8-bit R, G, and B component values, for the sake of simplicity.

The input image 200 is input to an image reduction unit 201, which generates a reduced image required for an image analysis unit 202 (to be described later) to execute processing. Using the reduced image, the processing load on the image analysis unit 202 can be reduced compared to a case in which the input image 200 is input intact to the image analysis unit 202. A reduction processing method in this unit is not particularly limited.

The reduced image is input to the image analysis unit 202, and undergoes image analysis processing. The image analysis processing includes processing for extracting an object (for example, a human face) in an image, and calculating an object color (a human skin color when the object is a human face), and processing for measuring a histogram of the entire image and calculating a highlight color (to be referred to as an HL color hereinafter). In this case, the HL color is the color of the brightest region of an image. Furthermore, image feature amounts to be calculated include average values, maximum values, and minimum values of lightness and saturation values of the entire image.

A plurality of types of image feature amounts obtained as analysis results of the image analysis unit 202 are input to an image analysis result modification unit 203, which modifies the image analysis results. Analysis values obtained as the analysis results of the image analysis unit 202 are not always correct. For example, as for human face detection, a non-human face region may be erroneously detected as a face region at a given probability. A color balance correction (to be described later) is performed based on the calculated HL color of an image. In this case, if a color different from a light source color at the time of shooting is erroneously calculated as the HL color, the color balance correction often does not normally operate. In consideration of the above problems, in this embodiment, the image analysis result modification unit 203 modifies respective feature amounts by various checking processes, and image processing in the subsequent stage is executed using the modified values, thus outputting a stable image which suffers less adverse image effects.

Next, a light source estimation unit 204 estimates a light source at the time of shooting using the HL color modified by the image analysis result modification unit 203 and the object color. The present invention is not particularly limited to the estimation method of the light source at the time of shooting, and an arbitrary method disclosed in, for example, Japanese Patent Laid-Open No. 2002-152772 described in the related art may be used. A color temperature under the light source at the time of shooting, which is estimated by the light source estimation unit 204, is calculated, and a highlight color under that condition is acquired, thus achieving first highlight color calculation processing.

When the light source estimation unit 204 performs light source estimation at the time of shooting, for example, a color temperature value of the light source at the time of shooting is determined as a result of the estimation, and is input to a first color conversion unit 205. Normally, since an image shot by a digital camera has undergone a unique color balance correction inside the camera, the first color conversion unit 205 cancels the color balance correction applied inside the camera to convert the input image 200 to a state before the color balance correction. In this case, by canceling the color balance correction unique to an image capturing device (for example, a camera) applied to the input image, an image before the color balance correction can be acquired.

The image after first color conversion in the first color conversion unit 205 is input to a second color conversion unit 206, which applies second color conversion processing to that image. The second color conversion unit 206 applies color conversion processing to the image in a state in which the color balance correction inside the camera is canceled in consideration of human visual characteristics, so as to approximate the actual "appearance" under the light source at the time of shooting. The image after the second color conversion is stored in the secondary storage device 104, is displayed on the monitor 111, or is printed on a print medium by the printer 110 as an output image 207. The block diagram of the processing of this embodiment has been described.

[Operations of Respective Processing Units]

Details of the processing will be described below with reference to the flowchart and the like in association with the operations of the respective units shown in FIG. 2A.

(Image Reduction Unit 201)

The image reduction unit 201 reduces the input image 200 to an image having a predetermined resolution, so as to improve the efficiency of the processing of the subsequent image analysis unit 202. For example, when an input image is a relatively high-resolution image having 4000×3000 pixels, if lightness and saturation values are calculated for, for example, all pixels at that resolution, a huge processing time is required for the image analysis unit 202. Hence, in this embodiment, the input image is reduced to an image having a minimum resolution (for example, 640×480 pixels) required for the image analysis unit 202, and this reduced image is input to the image analysis unit 202.

Note that in this embodiment, the reduction method is not particularly limited, and either of a nearest neighbor reduction method and a linear interpolation method may be used. The number of types of reduced images generated by the image reduction unit 201 is not limited to one. For example, a resolution of about 640×480 pixels suffices as the image resolution required to calculate average lightness and average saturation values in the image analysis unit 202. However, when object detection such as face detection is to be executed, a resolution of about 1024×768 pixels is required. In this case, the image reduction unit 201 may generate two types of reduced images, and may input them to the image analysis unit 202.

(Image Analysis Unit 202)

Figure 2B:
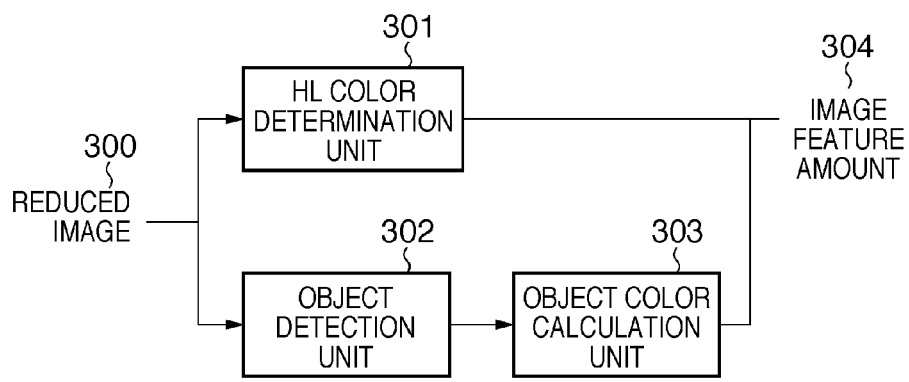

FIG. 2B is a block diagram showing detailed processing of the image analysis unit 202 shown in FIG. 2A. In this embodiment, the image analysis unit 202 is configured by only three blocks for the sake of simplicity, but the present invention is not limited to this. As shown in FIG. 2B, an HL color determination unit 301 calculates an HL color of an image based on a reduced image 300 obtained by the image reduction unit 201. The reduced image 300 is also input to an object detection unit 302, which detects a human face region as a principal object in the image. The principal object in this case indicates a main target to be shot in the shot image. In this embodiment, since an image includes a person as a main object, a principal object is a face of that person. Furthermore, an object color calculation unit 303 calculates an object color, that is, a skin color based on position information of the face region.

(Object Detection Unit 302, Object Color Calculation Unit 303)

The object detection unit 302 executes processing for detecting a principal object in an input image (in this case, the reduced image 300). The principal object mainly includes a human face. As a human face detection method used at this time, various methods have already been proposed. Japanese Patent Laid-Open No. 2002-183731 discloses the following method. That is, eye regions are detected from an input image, and a region around the eye regions is determined as a face candidate region. Luminance gradients and weights for luminance gradients are calculated for respective pixels, and are compared with gradients and weights for gradients of an ideal face reference image, which is set in advance. When an average angle between gradients is equal to or smaller than a predetermined threshold, it is determined that the input image has a face region.

According to Japanese Patent Laid-Open No. 2003-30667, a skin color region is detected from an image, and human iris color pixels are detected from the detected region, thereby detecting the positions of eyes.

Furthermore, according to Japanese Patent Laid-Open No. 8-63597, degrees of matching between a plurality of templates having face shapes and an image are calculated. A template corresponding to the highest degree of matching is selected, and when the highest degree of matching is equal to or higher than a predetermined threshold, a region in the selected template is set as a face candidate region. Using this template, the positions of eyes can be detected.

Moreover, according to Japanese Patent Laid-Open No. 2000-105829, an entire image or a designated region in the image is scanned using a nose image pattern as a template, and a best matching position is output as a nose position. Next, a region above the nose position of the image is considered as that including eyes, and the eye existing region is scanned using an eye image pattern as a template to calculate degrees of matching. Then, an eye existing candidate position set as a set of pixels having degrees of matching larger than a certain threshold is calculated. Furthermore, continuous regions included in the eye existing candidate position set are divided as clusters, and distances between the clusters and the nose position are calculated. The clusters having the shortest distance are determined as those including eyes, thus allowing detection of organ positions.

In addition, as methods of detecting a face and organ positions, Japanese Patent Laid-Open Nos. 8-77334, 2001-216515, 5-197793, 11-53525, 2000-132688, 2000-235648, and 11-250267 are known. Furthermore, a large number of methods such as Japanese Patent No. 2541688 have been proposed. In this embodiment, the method to be used is not particularly limited.

Furthermore, in these various face detection methods, a face detection reliability R_face can be generally calculated. This reliability R_face has a value ranging from 0 to 1.0, and when the reliability R_face is closer to 1.0, it is judged that the reliability of the detection result is higher. That is, the reliability can be determined based on a difference from a reference value. As this face detection reliability, in case of face detection based on a template matching method, a degree of matching with each template can be used as the face detection reliability. Also, in case of a face detection method by comparing face feature amounts such as the eye positions and skin color with those which are held in advance, a degree of matching with these feature amounts can be used as the face detection reliability. In this embodiment, any of these methods may be used.

When the object detection has succeeded, coordinates indicating the position of the principal object can be obtained. The coordinates may be those of a rectangle which includes a face region, or may be those of a circle, which is expressed by the center and radius. The coordinate information is input to the object color calculation unit 303, which analyzes colors of the principal object region. The color analysis generally means calculations of an average color in the detected principal object region. When pixels which form an image are expressed by RGB values, the average color can be obtained by calculating average values of RGB values of pixels included in the principal object region.

In this embodiment, an object color calculated by the above method is handled as (ObjR, ObjG, ObjB). Also, values (ObjY, ObjCb, ObjCr) obtained by converting the object color onto a YCbCr color space are similarly handled as an object color. As another method, RGB values of pixels included in the principal object region may be converted into luminance and color difference components, and average values of the color difference components may be calculated. In this case, a luminance-color difference color space may be, for example, any of a YC1C2 space and CIE L*a*b* space.

When the object detection unit 302 detects a plurality of principal objects, average colors calculated for respective object regions may be further averaged. Alternatively, in order to enhance a correction effect, an object color farthest from an ideal object color, which is set in advance, may be used as a reference. Conversely, in order to weaken a correction effect, a principal object closest to the ideal object color may be used as a reference.

(Calculation of Image HL Color)

The HL color determination unit 301 shown in FIG. 2B calculates an HL color of an input image. The HL color determination unit 301 executes second highlight color calculation processing. Various HL color calculation methods have been proposed, and any of these methods may be used as long as the present invention is applicable. In this embodiment, the HL color calculation method will be described below with reference to the sequence shown in FIG. 3. Note that the sequence shown in FIG. 3 is implemented when the CPU 101 reads out and executes a program stored in, for example, the RAM 102 as a storage unit.

Figure 3:
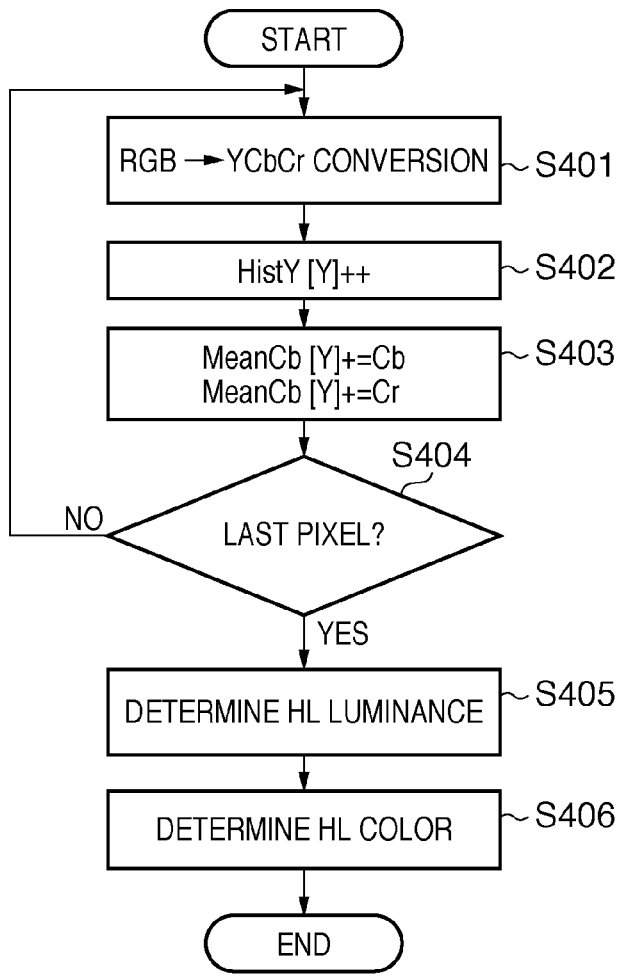
FIG. 3 is a flowchart of HL color calculation processing in an image analysis unit according to the present invention.

Referring to FIG. 3, a histogram of the reduced image 300 is calculated in steps S401 to S404. In step S401, the HL color determination unit 301 converts RGB values of respective pixels in the reduced image 300 into luminance and color difference components using known formulas. In this case, for example, RGB values are converted into YCbCr values. In step S402, the HL color determination unit 301 calculates a frequency histogram of luminance components Y. In this case, the histogram can be calculated by incrementing a Y-th element of a HistY array, which is initialized to zero.

In step S403, the HL color determination unit 301 makes the following calculations for arrays MeanCb and MeanCr so as to calculate average values of color difference values Cb and Cr for respective luminance values. The calculations are given by:

$$\text{Mean}Cb[Y] \mathrel{+}= Cb$$

$$\text{Mean}Cr[Y] \mathrel{+}= Cr \quad (1)$$

Figure 4:
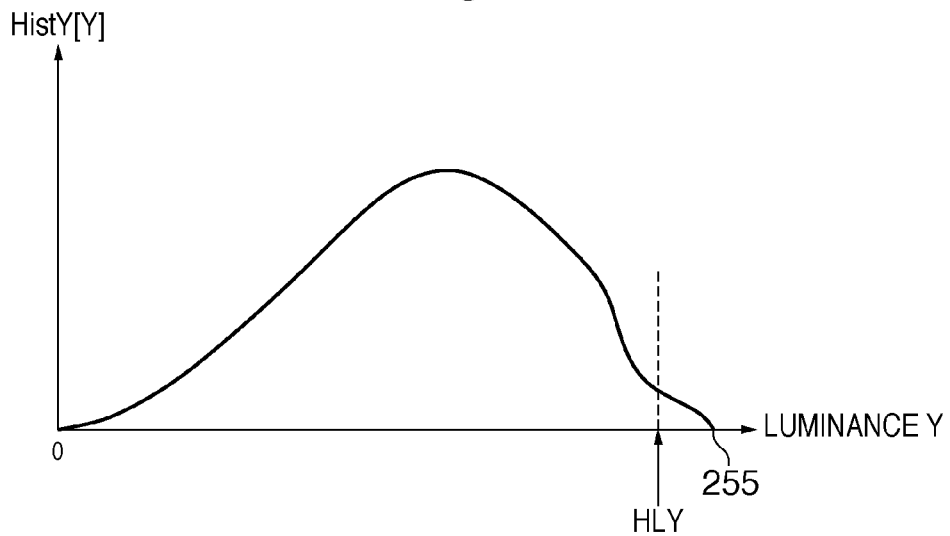
FIG. 4 is a graph for explaining processing for determining a highlight luminance value.

Upon completion of the processes in steps S401 to S404 for all the pixels of the reduced image 300, the luminance histogram array HistY stores a frequency distribution shown in FIG. 4. Hence, in step S405 the HL color determination unit 301 determines a highlight luminance value HLY using HistY. As HLY in this embodiment, values of HistY[Y] are accumulated in turn from smaller luminance values, and a luminance value Y when the accumulated frequency reaches 99% of the entire reduced image 300 is determined as the highlight luminance value HLY. Note that the accumulated frequency ratio required to determine HLY is not limited to 99%. On the other hand, if a luminance value can be specified during accumulation processing, the luminance value may be determined at that time, and the processing may end.

In step S406, the HL color determination unit 301 calculates color values HLCb and HLCr of an HL region using the determined value HLY. These values are respectively calculated by:

$$HLCb = \text{Mean}Cb[HLY] \div \text{Hist}Y[HLY]$$

$$HLCr = \text{Mean}Cr[HLY] \div \text{Hist}Y[HLY] \quad (2)$$

With the aforementioned processing, the second highlight color determination processing is attained. The calculated object color and HL color (HLCb and HLCr values) are input to the image analysis result modification unit 203.

(Image Analysis Result Modification Unit 203)

The image analysis result modification unit 203 is a processing unit which modifies the analysis results calculated by the image analysis unit 202. This unit modifies the HL color of the input image calculated by the image analysis unit 202 using an HL color blackbody locus based on a spectral distribution, which is held in advance. The HL color blackbody locus will be described first.

Assuming an ideal blackbody, a distribution of the wavelengths of light radiated by the blackbody at a certain temperature can be derived. For example, when a color "white" is expressed by a blackbody temperature, if the temperature is low, the color is close to orange; if the temperature is high, it is close to bluish white. The blackbody temperature expressed in this case is called a color temperature (K: Kelvin). The HL color blackbody locus used in this embodiment represents a locus of colors of a bright region, that is, HL colors when the color temperature of illumination is changed. For example, the blackbody locus will be described below with reference to FIG. 5A.

Figure 5A:
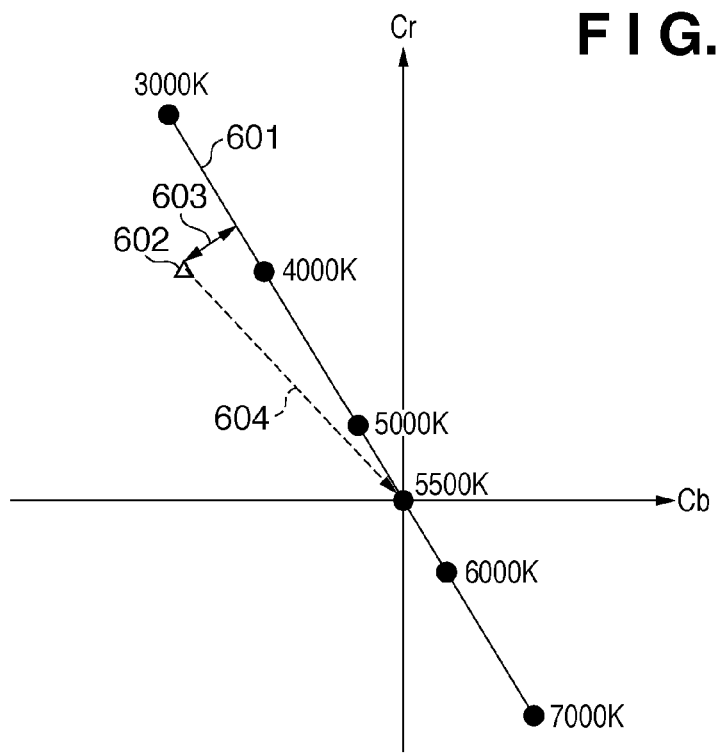
FIGS. 5A and 5B are graphs for explaining processing for modifying an HL color of an input image using an HL color blackbody locus.

FIG. 5A is a graph which plots, on a Cb-Cr plane, the color difference component values HLCb and HLCr of the HL color of the input image and the HL color blackbody locus based on the spectrum distribution, which is held in advance. FIG. 5A shows HL colors when the color temperature is changed from, for example, 3000K (•) to 7000K (•). A locus which connects HL colors obtained when the color temperature is changed is an HL color blackbody locus 601.

Referring to FIG. 5A, coordinates 602 (Δ) represent those of the color difference component values HLCb and HLCr of the HL color analyzed from the input image. Also, a two-headed arrow 603 represents a distance to a position where the coordinates 602 are closest to the HL color blackbody locus 601. A broken arrow 604 represents a distance between the coordinates 602 and (Cb, Cr)=(0, 0). As shown in FIG. 5A, an image, which has undergone a color balance correction inside a digital camera, generally has the color difference component values HLCb and HLCr of the HL color of the input image, which are located at a position close to the HL color blackbody locus 601. In this case, since the detected HL color is more likely to be correctly detected, it is desired to positively execute the color balance correction. Conversely, when the color difference component values HLCb and HLCr of the HL color of the input image are farther away from the HL color blackbody locus 601, since the HL color is more likely to be erroneously detected, it is desired to suppress the correction amount of the color balance correction. That is, the correction amount is controlled according to a difference between a reference value and the analyzed value.

For example, when the user brings a camera closer to yellow flowers to shoot an image of the yellow flowers within the entire frame in a macro mode, the yellow flower portion is unwantedly detected as an HL color. In this case, when this HL color is used intact to apply the color balance correction that sets the HL color to be white, the yellow flowers are also corrected to be white, thus causing a considerable adverse effect. An example in which the color difference component values HLCb and HLCr of the HL color of the input image are farther away from the HL color blackbody locus 601 will be described below with reference to FIG. 5B.

Figure 5B:
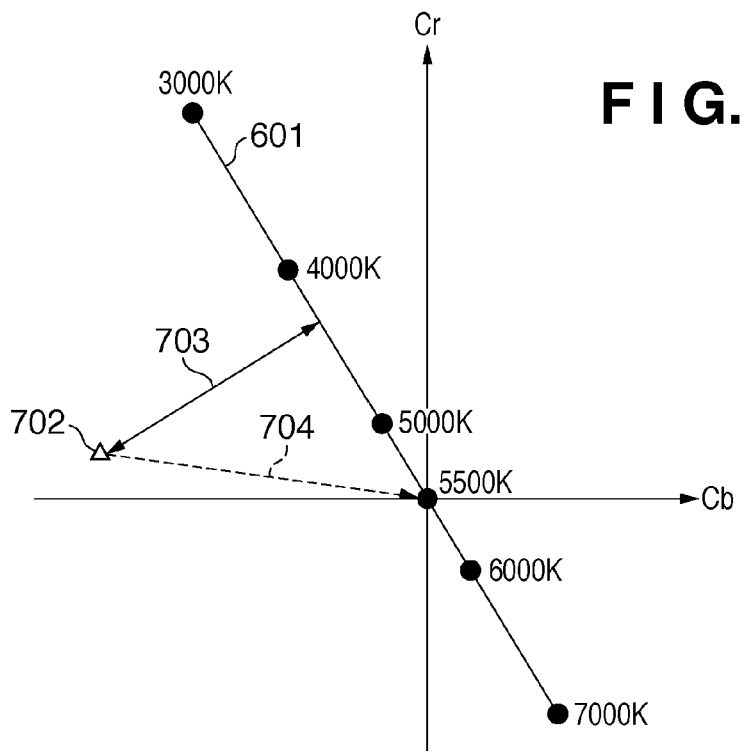

FIG. 5B is a graph which plots, on the color difference Cb-Cr plane, the color difference component values HLCb and HLCr of the HL color of the input image and the blackbody locus of HL colors based on the spectral distribution, which is held in advance. As in FIG. 5A, a locus that connects HL colors obtained when the color temperature is changed from 3000K (•) to 7000K (•) is set as the HL color blackbody locus 601.

As an example in which the color difference component values HLCb and HLCr of the HL color of the input image are farther away from the HL color blackbody locus 601, these color difference component values HLCb and HLCr are indicated by coordinates 702 (Δ). A two-headed arrow 703 represents a distance to a position where the coordinates 702 are closest to the HL color blackbody locus 601. Also, a broken arrow 704 represents a distance between the coordinates 702 and (Cb, Cr)=(0, 0). In this embodiment, a method for suppressing the correction amount of the color balance correction is implemented by modifying the color difference component values HLCb and HLCr of the HL color of the input image.

Figure 6A:
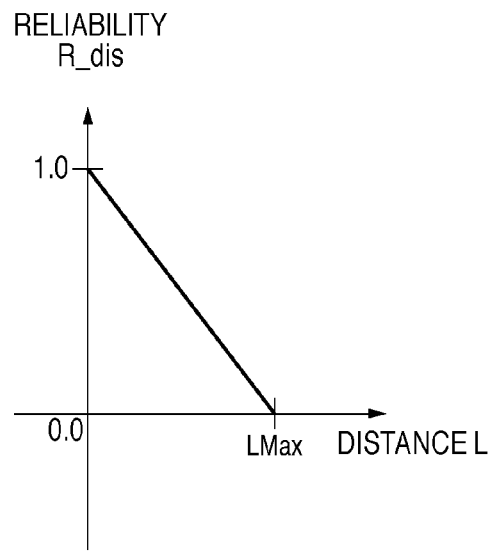
FIGS. 6A, 6B, 6C, and 6D are graphs for explaining processing for calculating a reliability using an HL color blackbody locus.

As a method of modifying the color difference component values HLCb and HLCr of the HL color of the input image, modification is made based on the distance between the color difference component values HLCb and HLCr of the HL color of the input image and the HL color blackbody locus. An example in which the color difference component values HLCb and HLCr of the HL color of the input image are modified will be described below with reference to FIGS. 5A and 5B and FIG. 6A. FIG. 6A is a graph showing a function which defines a reliability R_dis of the color difference component values HLCb and HLCr of the HL color of the input image with respect to the distance between the color difference component values HLCb and HLCr of the HL color of the input image and the HL color blackbody locus 601.

Referring to FIG. 6A, let L be a distance between the coordinates of the color difference component values HLCb and HLCr of the HL color of the input image and the HL color blackbody locus 601. Also, let R_dis be a reliability, which is calculated based on the distance L, of the color difference component values HLCb and HLCr of the HL color analyzed from the input image. Furthermore, Lmax used upon calculation of the reliability R_dis is set in advance. Assume that Lmax is defined in correspondence with characteristics (an object type, colors included in an image, etc.) of a target image. In this embodiment, assume that the reliability R_dis assumes a value ranging from 0 (minimum) to 1.0 (maximum). In FIG. 6A, the reliability R_dis is calculated by:

When $L\text{Max} > L, R\_\text{dis} = (L\text{Max} - L)/L\text{Max}$

When $L\text{Max} \leq L, R\_\text{dis} = 0.0$ (3)

For example, assume that the coordinates 602 of the color difference component values HLCb and HLCr of the HL color of the input image shown in FIG. 5A are expressed by (HLCb, HLCr)=(−20, 20). Also, assume that the coordinates 702 of the color difference component values HLCb and HLCr of the HL color of the input image shown in FIG. 5B are expressed by (HLCb, HLCr)=(−20, 4).

The distance L between the color difference component values HLCb and HLCr of the HL color of the input image and the HL color blackbody locus 601 is calculated first. As a method of calculating the distance L, for example, a distance between the color difference component values HLCb and HLCr of the HL color of the input image and a position corresponding to a normal depending from the coordinates of the color difference component values to the HL color blackbody locus 601 is calculated as the distance L.

For example, assume that the distance L between the coordinates 602 of the color difference component values HLCb and HLCr of the HL color analyzed from the input image and the HL color blackbody locus 601 in FIG. 5A is 10. Also, assume that the distance L between the coordinates 702 of the color difference component values HLCb and HLCr of the HL color analyzed from the input image and the HL color blackbody locus 601 in FIG. 5B is 50.

Next, a reliability R_dis is calculated using pre-set LMax and the calculated distance L using equations (3). For example, the reliability R_dis is calculated to have pre-set LMax=100. In the following description, pre-set LMax=100, but it is a value to be arbitrarily set, and is not particularly limited. Calculation examples of the reliabilities R_dis of the coordinates 602 in FIG. 5A and the coordinates 702 in FIG. 5B are as follows.

Reliability of $HL$ color coordinates 602: $R\_\text{dis} = (100 - 10)/100 = 0.9$ Reliability of $HL$ color coordinates 702: $R\_\text{dis} = (100 - 50)/100 = 0.5$ Next, the coordinates of the color difference component values HLCb and HLCr of the HL color analyzed from the input image are converted using the calculated reliability R_dis. As a coordinate conversion method, processing for making the coordinates of the color difference component values HLCb and HLCr of the HL color analyzed from the input image be closer to an origin (Cb, Cr)=(0, 0) as a reference position is executed. This coordinate conversion formula is given such that (Cb', Cr') are coordinates after conversion:

$(Cb', Cr') = (HLCb \times R\_\text{dis}, HLCr \times R\_\text{dis})$ (4)

Examples of coordinate conversion processing for making the coordinates 602 and 702 of the HL colors be closer to (Cb, Cr)=(0, 0) using the reliabilities R_dis with respect to the coordinates shown in FIGS. 5A and 5B are as follows.

Coordinates 602: $(Cb', Cr')=(-20\times0.9, 20\times0.9)=(-18, 18)$

Coordinates 702: $(Cb', Cr')=(-20\times0.5, 4\times0.5)=(-10, 2)$

Next, the color difference component values HLCb and HLCr of the HL color analyzed from the input image are replaced by the coordinate values after conversion:

$$HLCb=Cb'$$

$$HLCr=Cr' \quad (5)$$

In FIG. 5A, the coordinates 602 (HLCb, HLCr) of the color difference components of the HL color of the input image are modified from (−20, 20) to (−18, 18). Also, in FIG. 5B, the coordinates 702 (HLCb, HLCr) of the color difference components of the HL color of the input image are modified from (−20, 4) to (−10, 2).

As described above, the color difference component values HLCb and HLCr of the HL color analyzed from the input image follow the relationship between the reliability R_dis and distance L, which is defined in FIG. 6A. That is, as the distance to the HL color blackbody locus 601 becomes shorter, as shown in FIG. 5A, the degree of modification is decreased, and as the distance to the HL color blackbody locus 601 becomes farther, as shown in FIG. 5B, the degree of modification is increased.

When larger modification is applied to the coordinates 702 shown in FIG. 5B compared to coordinates having the smaller distance L, the HL color of the image becomes closer to the origin. When light source estimation (to be described later) is executed using the HL color near the origin, a gray pixel group as a target of the light source estimation becomes an achromatic color at a higher probability. Even when the light source estimation is executed using a gray pixel group of the achromatic color and a skin color pixel group, a light source estimation value output as a result of the light source estimation assumes a value around a color temperature (5000 to 5500K) under daylight as a standard color at a higher probability. Since the correction amount of the color balance correction becomes weak for an image which is determined that its HL color is near the color temperature, the color balance correction amount (to be described later) can be consequently suppressed by making the HL color be closer to the origin.

Therefore, for example, assuming that an input image includes an image of yellow flowers shot in the macro mode, the HL color of the image is yellow having a high saturation value, and is farther away from the HL color blackbody locus. In this case, since the HL color is modified to a position near the origin to suppress the color balance correction, a correction error that the yellow flowers are corrected to be white can be suppressed.

This embodiment has been described under the assumption that an input image has undergone the color balance correction in an image capturing apparatus at the time of shooting. The color balance correction in the image capturing apparatus basically executes color balance control so that the HL color of an image is located near the blackbody locus shown in FIG. 5A. For this reason, for an image shot by the image capturing apparatus in a normal operation, the color balance correction satisfactorily functions even when the present invention is applied, and a color balance correction effect is never reduced due to excessive suppression.

However, a possibility that the color balance correction in the image capturing apparatus does not normally function due to an arbitrary cause, and the HL color of an image largely deviates from the blackbody locus is not zero. For example, in a recent image capturing apparatus, a human face region is detected from a shooting field angle, and color balance control is executed using that face color. At this time, for example, when a mountain surface in the landscape is erroneously recognized as a human face, since a skin color value is erroneously detected, the color balance may be largely broken, and the HL color of an image may largely deviate from the blackbody locus. When the present invention is applied to such an image, the color balance correction may be suppressed, and an image having an improper color balance may be output intact. However, the probability of the aforementioned detection error is very low. Hence, as a characteristic feature of the present invention, larger importance is attached to a merit that the color balance of an yellow flower image is not erroneously corrected rather than a demerit that the aforementioned image having the improper color balance cannot be corrected.

In this embodiment, when the reliability R_dis is calculated, as shown in FIG. 6A, positions from a distance L=0 to LMax are coupled by a straight line, and the reliability R_dis decreases with increasing distance L. Using FIG. 6A, between input images having slightly different HL colors, since their reliabilities R_dis are not so different, the color balance correction processing can be similarly applied to these images without generating a large difference. For example, when images of the same area are shot within a short period of time like those which are shot in a continuous shooting mode, input images having slightly different HL colors are generated. Since the reliability R_dis is changed according to the distance L, as shown in FIG. 6A, images corrected results after the color balance correction can be generated.

Figure 6B:
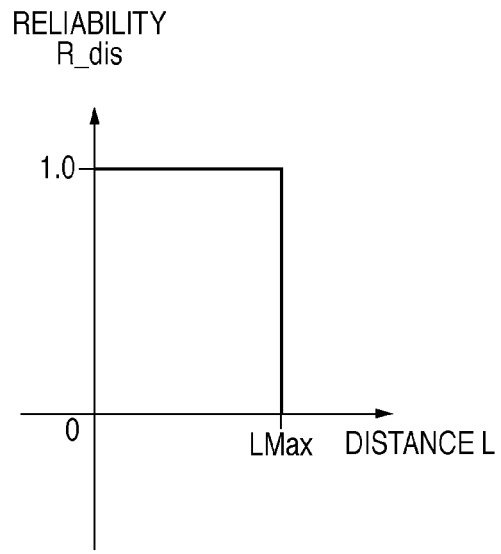

In this embodiment, the reliability R_dis is calculated using FIG. 6A. However, the present invention is not limited to this. For example, another reliability calculation method will be described using FIG. 6B. Referring to FIG. 6B, as in FIG. 6A, let L be a distance between the coordinates of the color difference component values HLCb and HLCr of the HL color analyzed from the input image and the HL color blackbody locus. Also, let R_dis be a reliability, which is calculated based on the distance L, of the color difference component values HLCb and HLCr of the HL color analyzed from the input image. Furthermore, Lmax used upon calculation of the reliability R_dis is set in advance. In this embodiment, assume that the reliability R_dis assumes a value ranging from 0 (minimum) to 1.0 (maximum).

As a difference from FIG. 6A, in FIG. 6B, the reliability R_dis is set to be constant, that is, 1.0 independently of the distance L between the coordinates of the color difference component values HLCb and HLCr of the HL color analyzed from the input image and the HL color blackbody locus. That is, the reliability R_dis is defined as follows:

When $L\text{Max}>L, R\_dis=1.0$

When $L\text{Max}\leq L, R\_dis=0.0 \quad (3')$

For example, when it is empirically judged based on the distance between the coordinates of the color difference component values HLCb and HLCr of the HL color analyzed from the input image and the HL color blackbody locus whether or not an HL color is erroneously detected, the constant reliability shown in FIG. 6B can enhance an effect compared to that shown in FIG. 6A. For example, when the distance L assumes a small value, the color balance correction can be positively executed. On the other hand, when the distance L assumes a large value, an effect of strongly suppressing the color balance correction very much can be expected.

Figure 6C:
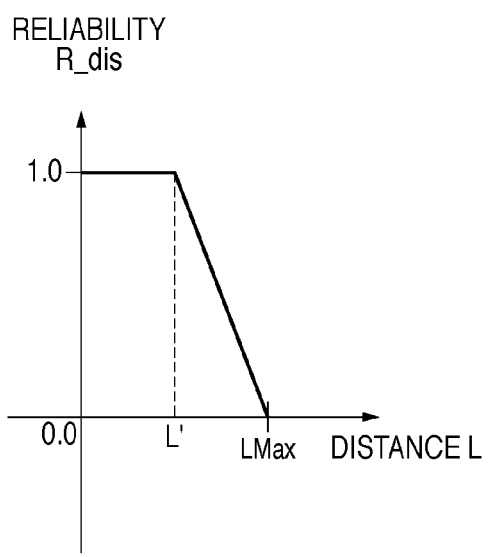
Figure 6D:
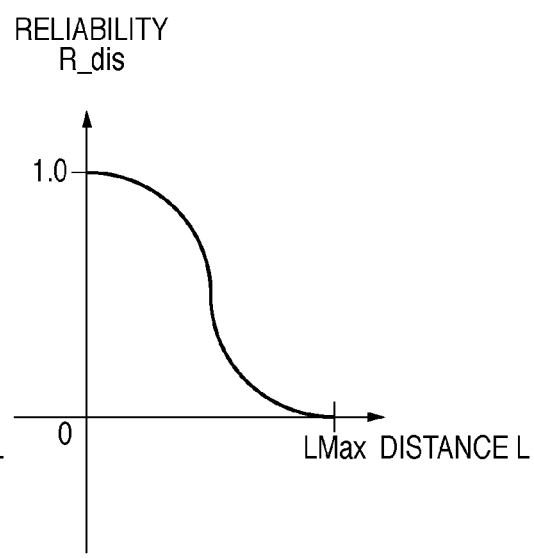

As yet another method of calculating the reliability R_dis, for example, nonlinear functions may be used, as shown in FIGS. 6C and 6D. In FIGS. 6C and 6D, as in FIG. 6A, let L be a distance between the coordinates of the color difference component values HLCb and HLCr of the HL color analyzed from the input image and the HL color blackbody locus. Also, let R_dis be a reliability, which is calculated based on the distance L, of the color difference component values HLCb and HLCr of the HL color analyzed from the input image. Furthermore, Lmax used upon calculation of the reliability R_dis is set in advance. In this embodiment, assume that the reliability R_dis assumes a value ranging from 0 (minimum) to 1.0 (maximum).

In FIG. 6C, as a difference from FIG. 6A, within a range in which the distance L between the coordinates of the color difference component values HLCb and HLCr of the HL color analyzed from the input image and the HL color blackbody locus is small ($0 \leq L < L'$), the reliability R_dis is set to be constant (1.0). Furthermore, within a range in which the distance L from the HL color blackbody locus is large ($L' \leq L < L\text{Max}$), the reliability R_dis is set to be decreased in proportion to the distance. When L is larger than Lmax, the reliability R_dis is set to be zero. In this case, the value L' may be empirically defined, or may be varied in correspondence with image characteristics. Therefore, FIG. 6C is defined as follows.

When $0 \leq L < L'$, R_dis=1.0

When $L' \leq L < L\text{max}$, R_dis=$(L\text{Max}-L)/L\text{Max}$

When $L\text{Max} \leq L$, R_dis=0.0 (3")

In FIG. 6D, as a difference from FIG. 6A, positions from L=0 to LMax are coupled by an S-curve to smoothly change the reliability R_dis. The S-curve is set to make the reliability R_dis be closer to zero when the distance L between the coordinates of the color difference component values HLCb and HLCr of the HL color analyzed from the input image and the HL color blackbody locus is small, and to make the reliability R_dis be closer to 1.0 when the distance L is large.

In both FIGS. 6C and 6D, when the distance L between the coordinates of the color difference component values HLCb and HLCr of the HL color analyzed from the input image and the HL color blackbody locus assumes a small value, a high reliability R_dis is set; when the distance L assumes a large value, a low reliability R_dis is set. Also, the reliability R_dis is changed according to the distance L. Therefore, when the distance L between the coordinates of the color difference component values HLCb and HLCr of the HL color analyzed from the input image and the HL color blackbody locus assumes a large value, the correction processing can be positively executed. Furthermore, since the reliabilities R_dis of images having slightly different HL colors do not have a large difference, these images can undergo the correction processing to have nearly the same effects.

Arbitrary conversion methods may be used as long as they are methods of changing the HL color based on the distance between the coordinates of the color difference component values HLCb and HLCr of the HL color analyzed from the input image and the HL color blackbody locus, as shown in FIGS. 6A to 6D. The method of modifying the HL color of the input image, which is calculated by the image analysis unit 202, using the HL blackbody locus based on the spectral distribution, which is held in advance, has been described.

As still another image analysis result modification method, a method of modifying the HL color of the input image, which is calculated by the image analysis unit 202, using a relationship between a human skin color and the HL color analyzed from the input image may be used in addition to the aforementioned methods. The method of modifying the HL color of the input image using a correlation between a human skin color and the HL color analyzed from the input image will be described below.

Figure 7A:
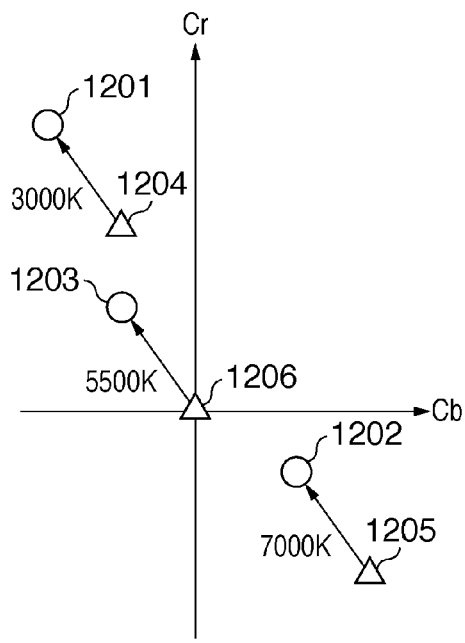
FIGS. 7A, 7B, and 7C are graphs for explaining processing for modifying an HL color of an input image using a skin color and the HL color.

Using a human skin color as an object color, the object color and HL color can be plotted on the Cb-Cr plane on the YCbCr space like an object color 1201 and HL color 1204 in FIG. 7A under a 3000K light source. Also, the object color and HL color can be plotted like an object color 1203 and HL color 1206 under a daylight light source (5500K), and like an object color 1202 and HL color 1205 under an 8000K light source.

As can be seen from FIG. 7A, as a characteristic feature, the relationship between the object color and HL color is maintained nearly constant even when the light source is changed. As the relationship in this case, a relational expression between the HL color and object color is constant. As another characteristic feature, if the object color in this case is a human skin color, lightness values of skin colors are largely different depending on races, but color components do not have a large difference, as disclosed in various references. Therefore, as a characteristic feature, the relationships between the HL colors and skin colors shown in FIG. 7A are nearly constant according to races. Therefore, as the relationship between the two colors, as shown in FIG. 7A, is broken larger, the object color and/or the HL color are/is more likely to be erroneously detected.

Using these characteristic features, the object color and HL color can be expressed by a vector relationship. That is, it can also be expressed that directions and lengths of vectors from the coordinates of HL colors to those of corresponding object colors on the Cr-Cb plane are the same. Hence, in this embodiment, a vector between a reference object color and reference HL color is formed as a reference vector, and a detected vector between an object color and HL color is properly modified by modifying the HL color so as to be closer to the reference vector. In this specification, color components corresponding to a human skin color will also be described as "skin color" based on the aforementioned reason, for the purpose of convenience.

In order to properly modify a detected vector, a measure of reliability is calculated to determine a modification amount. Assume that the reliability becomes lower as the relationship between an object color and HL color is broken larger than that between the reference object color and reference HL color. Hence, by modifying the positional relationship between an object color and HL color according to the reliability, a detected vector can be made closer in a proper direction.

Cases will be described below wherein a detected vector is proper and improper. In this case, a white point under a daylight light source is set as the reference HL color, and a human skin color under the daylight light source is set as the reference object color.

Figure 7B:
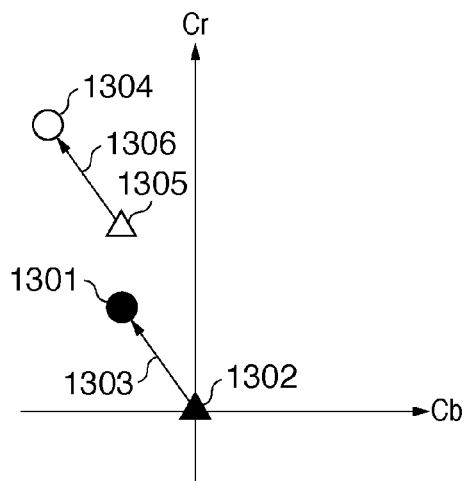

This image processing apparatus holds in advance a reference vector 1303, which is determined based on a reference object color 1301 and reference HL color 1302, which are set, as shown in FIG. 7B. On the other hand, a detected vector 1306 is calculated from an object color (ObjCb, ObjCr) 1304 and HL color (HLCb, HLCr) 1305 calculated by the object color calculation unit 303.

When the reference vector 1303 and detected vector 1306 have the same magnitude, an inner product is calculated based on their directions, and a reliability R_Vec is calculated by:

$$R\_Vec=(1+((\text{inner product of reference vector} \cdot \text{detected vector})/((\text{magnitude of reference vector})^2)))/2 \quad (5)$$

where "X^Y" is "X to the Y-th power".

When the object color 1304 and HL color 1305 are located at the positions shown in FIG. 7B, since the reference vector 1303 and detected vector 1306 have the same direction and magnitude, the inner product is 1. The reliability at that time is 1.

A case will be described below with reference to FIG. 7C wherein the detected vector is improper. That is, a case will be described below wherein an HL color (HLCb, HLCr) or object color (ObjCb, ObjCr) is erroneously detected. A detected vector 1403 determined by an object color 1401 and HL color 1402 shown in FIG. 7C may have a different angle and magnitude from those of a reference vector 1406 determined by a reference object color 1404 and reference HL color 1405.

Figure 7C:
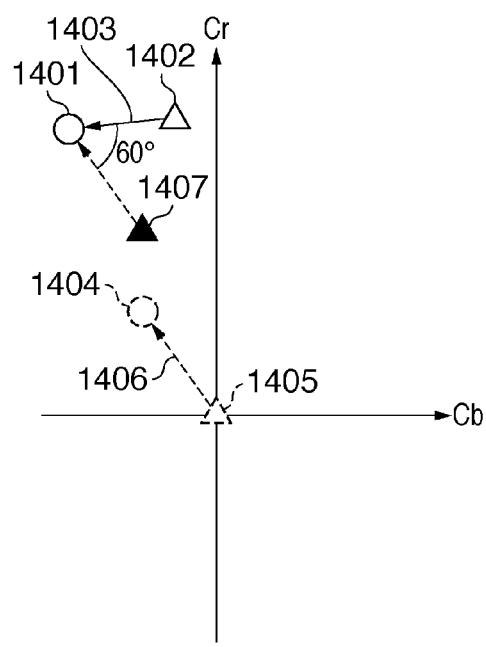

When the object color 1401 and HL color 1402 are located at positions shown in FIG. 7C, since the directions of the detected vector 1403 and reference vector 1406 are different through 60°, a reliability R_Vec at this time is 0.75 according to equation (5) used to calculate a reliability.

An example in which the HL color 1402 is modified based on the reliability R_Vec (=0.75) obtained to obtain a proper detected vector 1403, as described above, will be described first. Note that the reliability may be equivalent to a weighting coefficient.

In this case, the detected HL color (HLCb, HLCr) 1402 will be referred to as a first HL color (f_HLCb, f_HLCr) hereinafter, and a modified HL color will be referred to as a second HL color (s_HLCb, s_HLCr) hereinafter. The second HL color can be calculated by:

$$s\_HLCb=b\_HLCb+(f\_HLCb-b\_HLCb)\times R\_Vec$$

$$s\_HLCr=b\_HLCr+(f\_HLCr-b\_HLCr)\times R\_Vec \quad (6)$$

wherein a reference HL color (b_HL) is a point moved from the object color 1401 by a distance corresponding to the reference vector 1406. The reference HL color (b_HL) is an HL color 1407 in FIG. 7C.

In this case, when the reliability is 1, since it is judged that the HL color is reliable, the first HL color is used as the second HL color. On the other hand, when the reliability is 0, since it is judged that the HL color is not reliable, the reference HL color is used as the second HL color. When the reliability is larger than 0 and is smaller than 1, the second HL color is determined between the reference HL color and first HL color according to a weighting coefficient.

The range and value of the reliability, reference HL color, and reference object color can be arbitrarily determined. Also, a predetermined color plane or space may be, for example, any of the YCbCr space, YC1C2 space, and CIE L*a*b* space. In the reliability calculation method of the present invention, the second HL color calculation method is not limited to equations (6) described above. The HL color information and object color information of the image modified by the aforementioned processing are input to the light source estimation unit 204 as the subsequent stage.

(Light Source Estimation Unit 204)

Details of the light source estimation unit 204 will be described below with reference to the flowchart shown in FIG. 8. In the present invention, a method of estimating the type or color temperature of a light source at the time of shooting from an input image is not particularly limited. In this case, processing will be described by applying a technique disclosed in Japanese Patent Laid-Open No. 2002-152772 as an example. This processing is implemented when the CPU 101 reads out and executes a program stored in, for example, the ROM 103 as a storage unit included in the image processing apparatus 100 which can implement the present invention.

Figure 8:
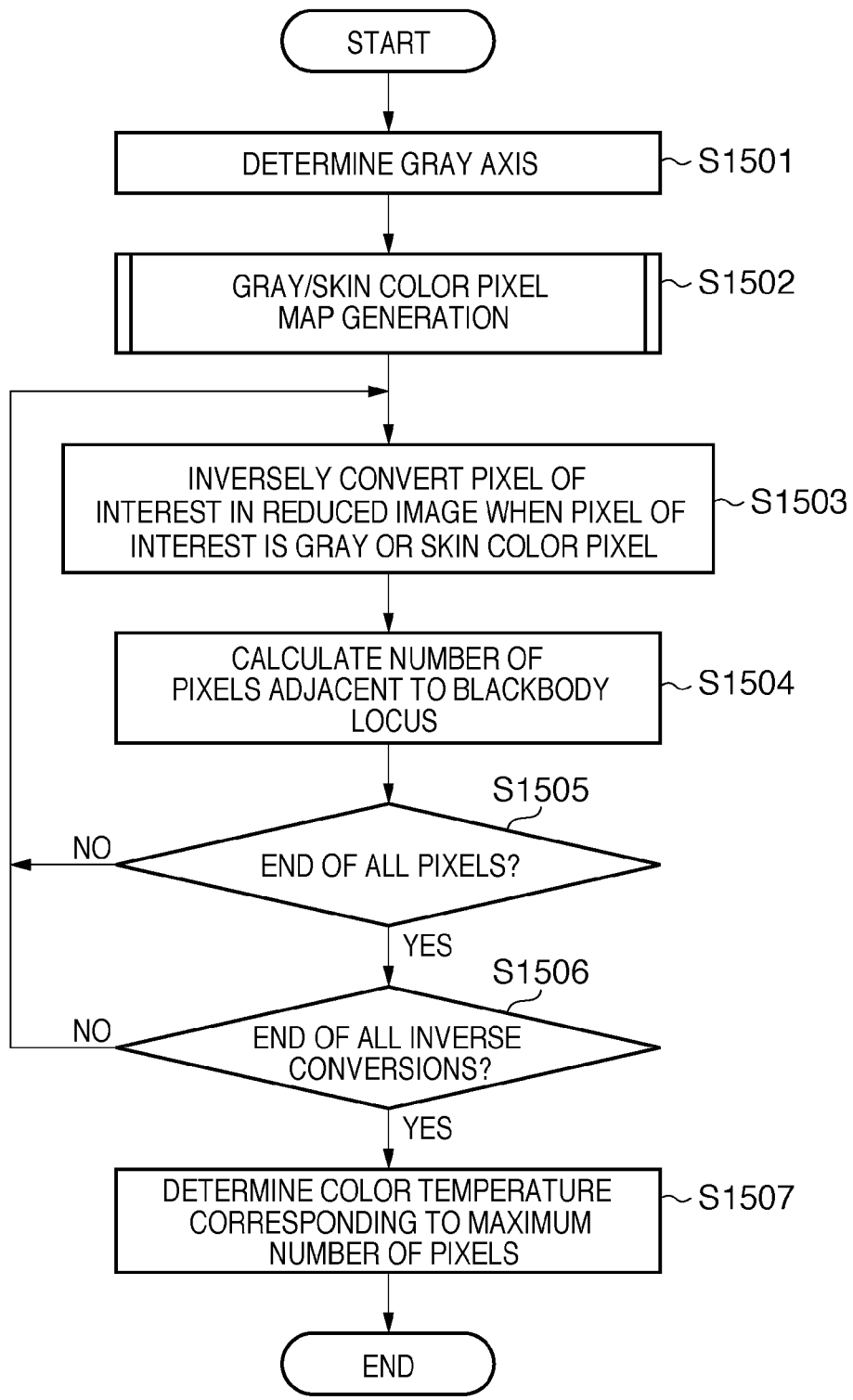
FIG. 8 is a flowchart of light source estimation processing according to the present invention.

Referring to FIG. 8, the light source estimation unit 204 determines a gray axis in the input image in step S1501. The gray axis is determined, as shown in FIGS. 9A and 9B, using HLCb and HLCr as the color of the aforementioned highlight region.

Figure 9A:
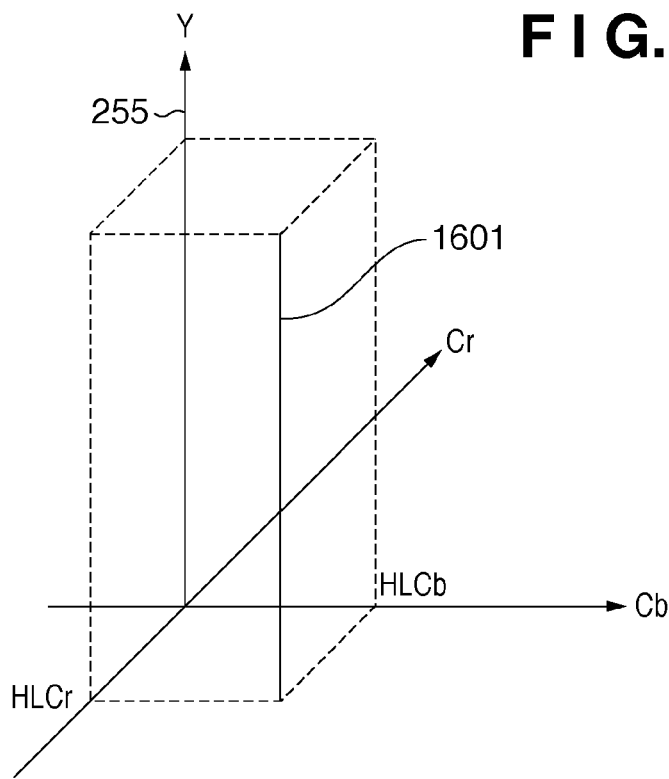
FIGS. 9A and 9B are graphs showing a setting example of a gray axis in a light source estimation unit according to the present invention.
Figure 9B:
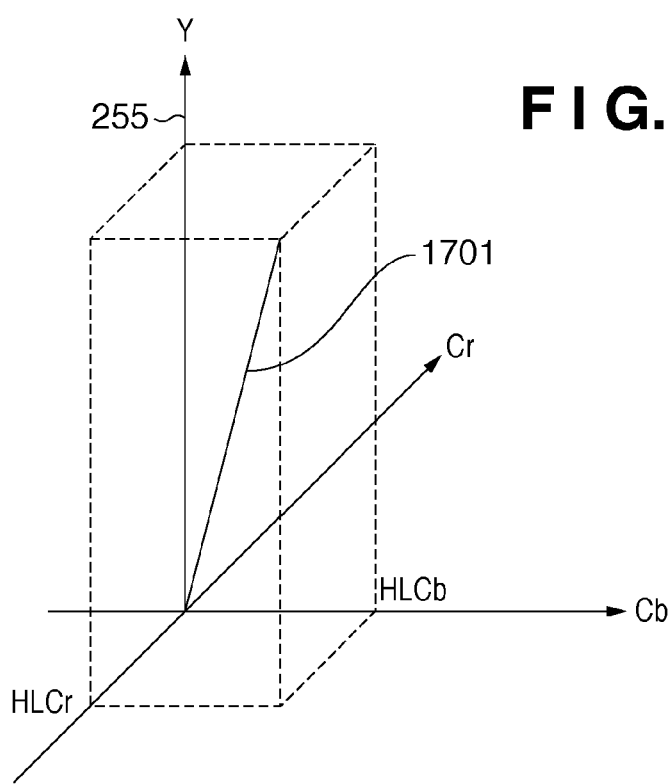

As shown in FIG. 9A, a straight line 1601 perpendicular to the color plane Cb-Cr on the YCbCr space is set as the gray axis. Alternatively, as shown in FIG. 9B, a straight line 1701 which satisfies (Cb=HLCb, Cr=HLCr) at Y=255 and (Cb=0, Cr=0) at Y=0 may be set as the gray axis.

Normally, a dark part of an image generated by an image capturing apparatus becomes dark since light does not reach a light-receiving element of the image capturing apparatus. Therefore, the dark part of the image is insusceptible to a light source. Hence, depending on the characteristics of the image capturing apparatus, when the latter gray axis is set, as shown in FIG. 9B, the light source estimation precision is often improved.

In step S1502, the light source estimation unit 204 extracts object color pixels and gray pixels in the input image to generate a map. The map is generated according to the sequence shown in FIG. 10. Note that a target image of the light source estimate may be the input image. However, since the input image has a high resolution, as described above, this embodiment will be described under the assumption that the light source estimation is executed using the reduced image generated for the histogram calculation processing. As a result, the processing time required for the light source estimation can be shortened, and the reduced image, which has already been generated, can be commonly used for different processes, thus saving a time required to generate a reduced image again.

The map generation processing shown in FIG. 10 will be described below. Assume that a gray/skin color map MAP[y][x] is defined as array data, and is held in, for example, the RAM 102. In step S1801, the light source estimation unit 204 initializes respective elements of the gray/skin color map MAP[y][x] to zero. In step S1802, the light source estimation unit 204 converts RGB component values of a pixel of interest of the reduced image to be processed into YCbCr values. In step S1803, the light source estimation unit 204 refers to the gray axis set on the YCbCr space in FIG. 9A or 9B to calculate a distance between the YCbCr values of the pixel of interest and the gray axis according to a known method of calculating a distance between a point and straight line. If the calculated distance is smaller than a predetermined threshold, the light source estimation unit 204 determines that the pixel of interest is a gray axis adjacent pixel (YES in step S1803), and sets a member associated with the position of the pixel of interest in the two-dimensional array MAP[y][x], which is prepared to have the same width and height as those of the reduced image, to be 1 in step S1804.

Figure 11:
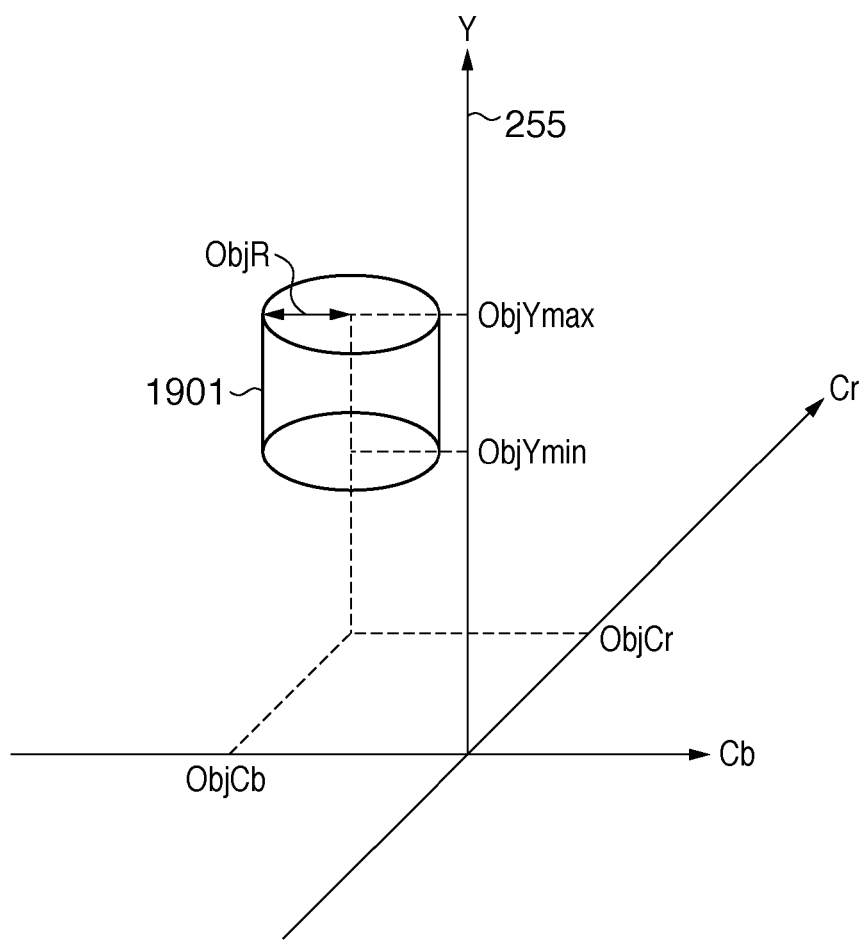
FIG. 11 is a graph for explaining processing for specifying skin color pixels according to the present invention.

If it is determined that the pixel of interest is not a gray axis adjacent pixel (NO in step S1803), the light source estimation unit 204 checks in step S1805 if the pixel of interest is a skin color adjacent pixel. In this embodiment, a cylindrical object color region 1901 shown in FIG. 11 is set on the YCbCr space based on the object color information (ObjY, ObjCb, ObjCr) calculated by the object color calculation unit 303. This region will be referred to as a skin color region hereinafter. Referring to FIG. 11, the object color region 1901 is defined by a cylinder which has the object color (ObjCb, ObjCr) as the center on the Cb-Cr color plane as the center, and a radius ObjR, which assumes a predetermined value. A height of the cylinder, which is defined by ObjYmax and ObjYmin, can be calculated, for example, by:

$$ObjYmax = ObjY + \Delta h$$

$$ObjYmin = ObjY - \Delta h \quad (7)$$

where $\Delta h$ is a predetermined constant, and ObjY is a luminance component of the object color calculated by the object color calculation unit 303.

When the pixel of interest is included in the object color region 1901, the light source estimation unit 204 judges in step S1805 that the pixel of interest is located adjacent to the object color (YES in step S1805), and sets a member associated with the position of the pixel of interest in MAP[y][x] to be 2 in step S1806. If the processing is complete for all pixels in the input image (YES in step S1807), this processing sequence ends. Note that this embodiment has explained the skin color region to have the cylindrical shape shown in FIG. 11 for the sake of simplicity. However, the present invention is not limited to this. For example, the skin color region may have a spherical shape which has the calculated object color as the center and has the radius ObjR, or other similar shapes. Even in this case, such modifications are incorporated in the scope of the present invention.

Figure 10:
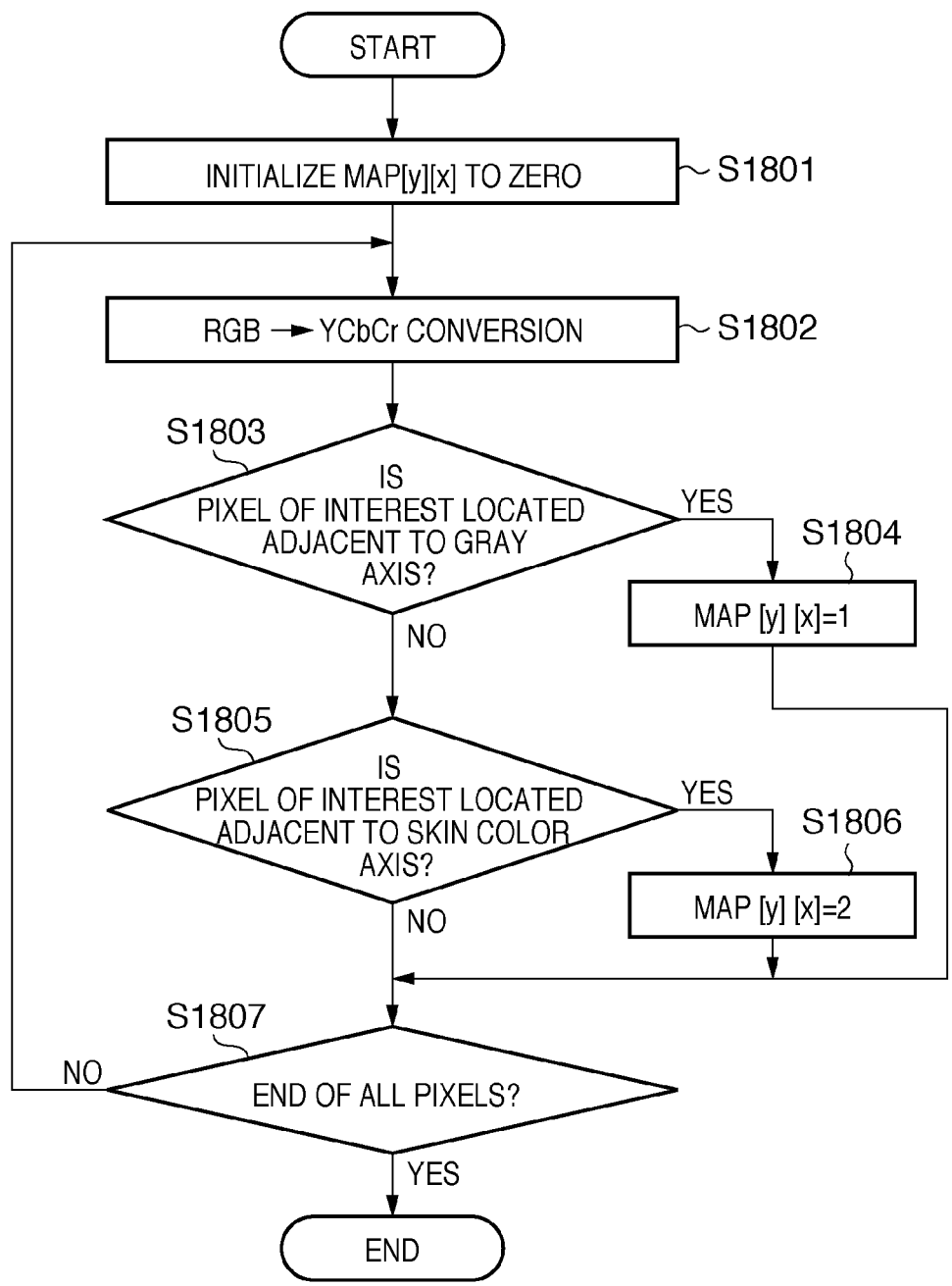
FIG. 10 is a flowchart of gray/skin color map generation processing in the light source estimation unit according to the present invention.

When the aforementioned gray/skin color pixel map can be successfully generated using FIG. 10, the light source estimation unit 204 then estimates a light source at the time of shooting in steps S1503 to S1507 in FIG. 8. The light source estimation method is not particularly limited in the present invention, but the following description will be given using the method described in Japanese Patent Laid-Open No. 2002-152772. According to Japanese Patent Laid-Open No. 2002-152772, a color balance correction of a normal camera is attained by multiplying RGB components by adjustment gains. Image data obtained by such adjustment shows a behavior different from image data obtained from spectral distribution characteristics of the camera.

More specifically, assume that loci of gray and skin color pixels calculated from the spectral characteristics of a camera under various light sources are used as blackbody loci. Inside the camera, the gray and skin color pixels before the color balance correction are distributed on the blackbody locus. However, when RGB components are multiplied by predetermined gains to attain the color balance correction inside the camera, the distribution of the gray and skin color pixels of the image obtained as a result of such color balance correction does not match the blackbody locus.

Using such characteristics, the image that has undergone the color balance correction is multiplied by various coefficients for respective pixels to attain inverse conversions of the color balance correction. Respective pixels of the image after each inverse conversion are plotted on a blackbody locus plane, and the number of gray and skin color pixels adjacent to the blackbody locus is counted. A case corresponding to the maximum counted number of pixels corresponds to a state at the time of shooting before the color balance correction, and a light source at the time of shooting is determined based on the blackbody locus corresponding to the distribution including the largest number of gray and skin color pixels. For further details of the light source estimation method, please refer to Japanese Patent Laid-Open No. 2002-152772.

The processes in steps S1503 to S1507 will be described below with reference to Japanese Patent Laid-Open No. 2002-152772. In step S1503, the light source estimation unit 204 multiplies respective RGB color components of a pixel of interest in the reduced image by various inverse conversion coefficients to attain inverse conversions of the color balance correction inside the camera, as described above.

In step S1503, the light source estimation unit 204 initially determines coefficients r, g, and b required to attain an inverse conversion. Assume that the coefficients r, g, and b are those which vary within, for example, a range from 0.5 to 1.5, and are incremented by 0.1. When the method described in Japanese Patent Laid-Open No. 2002-152772 is used intact, the coefficients r, g, and b have to be used in $10^3$, that is, 1000 inverse conversions. When the 1000 inverse conversions are applied to all target pixels included in the gray/skin color region, a huge amount of processing is required, posing a problem.

Hence, in consideration of this problem, this embodiment skips inverse conversion processes in directions opposite to the HL color of an image. More specifically, the HL color values (HLY, HLCb, HLCr) of the image analyzed by the image analysis unit 202 are converted into values on an RGB color space to obtain (HLR, HLG, HLB) values. HLR and HLB are compared, and when HLR>HLB, the subsequent inverse conversion processing is executed only when r>b of combinations of the inverse conversion coefficients r, g, and b. Conversely, when HLR<HLB, the subsequent inverse conversion processing is executed only when r<b of combinations of the inverse conversion coefficients r, g, and b.

As described above, the HL color of the input image reflects the type of a light source in a shooting environment to some extent at a very high probability even when the input image has undergone the color balance correction inside an image capturing apparatus. For example, in an image shot under an incandescent light source of around 3000K, the HL color of the image includes color components in an orange direction in place of a blue direction in most cases even when the color balance correction has been applied in the image capturing apparatus. Conversely, in an image shot under a high color temperature situation such as under shade outdoors in fair weather, the HL color of the image includes color components in the blue direction in most cases even when the color balance correction has been applied in the image capturing apparatus.

Therefore, by limiting the coefficients used to perform inverse conversions according to the balance of the color components of the HL color of the image, calculations which are not related to the image can be excluded. A light source estimation color temperature obtained as a result of the processing does not assume a calculated value opposite to the HL color of the image, thus allowing a stable color balance correction.

In step S1503, the light source estimation unit 204 multiplies RGB components of the pixel of interest of the reduced image by the inverse conversion coefficients r, g, and b determined by the aforementioned processing to obtain R', G', and B'. R', G', and B' are respectively calculated by:

$$R' = R \times r$$

$$G' = G \times g$$

$$B' = B \times b \quad (8)$$

However, in this embodiment, the inverse conversion is executed only when it is judged in step S1503 with reference to the aforementioned gray/skin color pixel map that the pixel of interest is a gray or skin color pixel, unlike the Japanese Patent Laid-Open No. 2002-152772. In this case, let count_g be the number of pixels judged as gray pixels, and count_h be the number of pixels judged as skin color pixels.

In this way, compared to Japanese Patent Laid-Open No. 2002-152772 that uses all pixels in an image, the method of this embodiment executes the light source estimation by excluding pixels which are not related to gray/skin color pixels, thereby improving the light source estimation precision and shortening the processing time required for the light source estimation.

After that, in step S1504 the light source estimation unit 204 converts R'G'B' components into predetermined color components, and calculates a distance from a blackbody locus defined in advance on a predetermined color plane. If the distance is equal to or smaller than a predetermined value, the light source estimation unit 204 judges that the R'G'B' values after the inverse conversion are located at a position adjacent to the blackbody locus, and counts up the number of pixels.

Since the processes in steps S1503 and S1504 are executed for all pixels of the input reduced image, the number of pixels adjacent to the blackbody locus can be calculated in association with one set of inverse conversion coefficient values (r, g, b). Then, the processes in steps S1503 to S1505 are repetitively executed for various inverse conversion sets, which are prepared in advance (S1506).

As a result, the light source estimation unit 204 calculates and stores an inverse conversion set (r_max, g_max, b_max) which corresponds to the maximum number of pixels adjacent to the blackbody locus in step S1507. Furthermore, the light source estimation unit 204 determines a color temperature K of a light source at the time of shooting according to the distribution of skin color/gray pixels on the blackbody locus in that set (please refer to Japanese Patent Laid-Open No. 2002-152772 for details). In this case, let count_max be a maximum value of the number of pixels adjacent to the blackbody locus.

A unit of K in this case is "Kelvin", and a value ranging from about 2500 to 10000 is normally held. Normally, when a light source at the time of shooting corresponds to daylight, a value around 5500K is held. In case of an orange light source such as an incandescent lamp, a value around 3000K is held. Also, in case of a cloudy day or shade, a value around 8000K is held.

In this case, a light source estimation reliability R_lse can be defined by:

$$R\_lse=(count\_max)/(count\_g+count\_h) \quad (9)$$

In equation (9), when count_max=(count_g+count_h), R_lse=1.0. This means that all pixels obtained when a pixel of interest is judged as a skin color or gray pixel in step S1503 are included in a range adjacent to the blackbody locus, and it can be judged that a light source estimation value as a result of the processing has a very high reliability. The light source estimation unit 204 has been described.

(First Color Conversion Unit 205)

The first color conversion unit 205 shown in FIG. 2A will be described below. The first color conversion unit 205 executes first color conversion processing for the purpose of canceling the color balance correction applied inside a camera. In this embodiment, the first color conversion processing can be executed by multiplying RGB component values of respective pixels in the input image by the stored inverse conversion set (r_max, g_max, b_max).

(Second Color Conversion Unit 206)

The second color conversion unit 206 shown in FIG. 2A executes second color conversion processing. The purpose of the second color conversion processing is to apply a color balance correction that considers human visual characteristics to an image, which has undergone the first color conversion processing to cancel the color balance correction inside a camera, based on the estimated color temperature of a light source at the time of shooting.

As one example of such color balance correction, the following description will be given using CIECAM02. The CIECAM02 is a Color Appearance Model formulated by CIE in 2002. The CIECAM02 allows to set an adaptation factor D of the human visual characteristics in addition to input parameters associated with viewing conditions (c, Nc, F, white point XYZ values of a viewing light source, etc.)

Using these parameters, those corresponding to a viewing condition A are set, and an input image is converted from an XYZ color space into a viewing condition independent color space JCh. From the converted JCh color space, another viewing condition B is designated to convert the image onto the XYZ space, thus reproducing the same "appearance" under both the viewing conditions.

The CIECAM02 is disclosed in various references: for example, CIE Publication, TC8-01, A Color Appearance Model for Colour Management Systems. For this reason, such references are to be referred to for details, and this embodiment will explain only an overview. This embodiment will explain a method of reproducing "appearance" under a light source at the time of shooting as that under a predetermined viewing condition (for example, a monitor or printed matter) using the CIECAM02.

Figure 12:
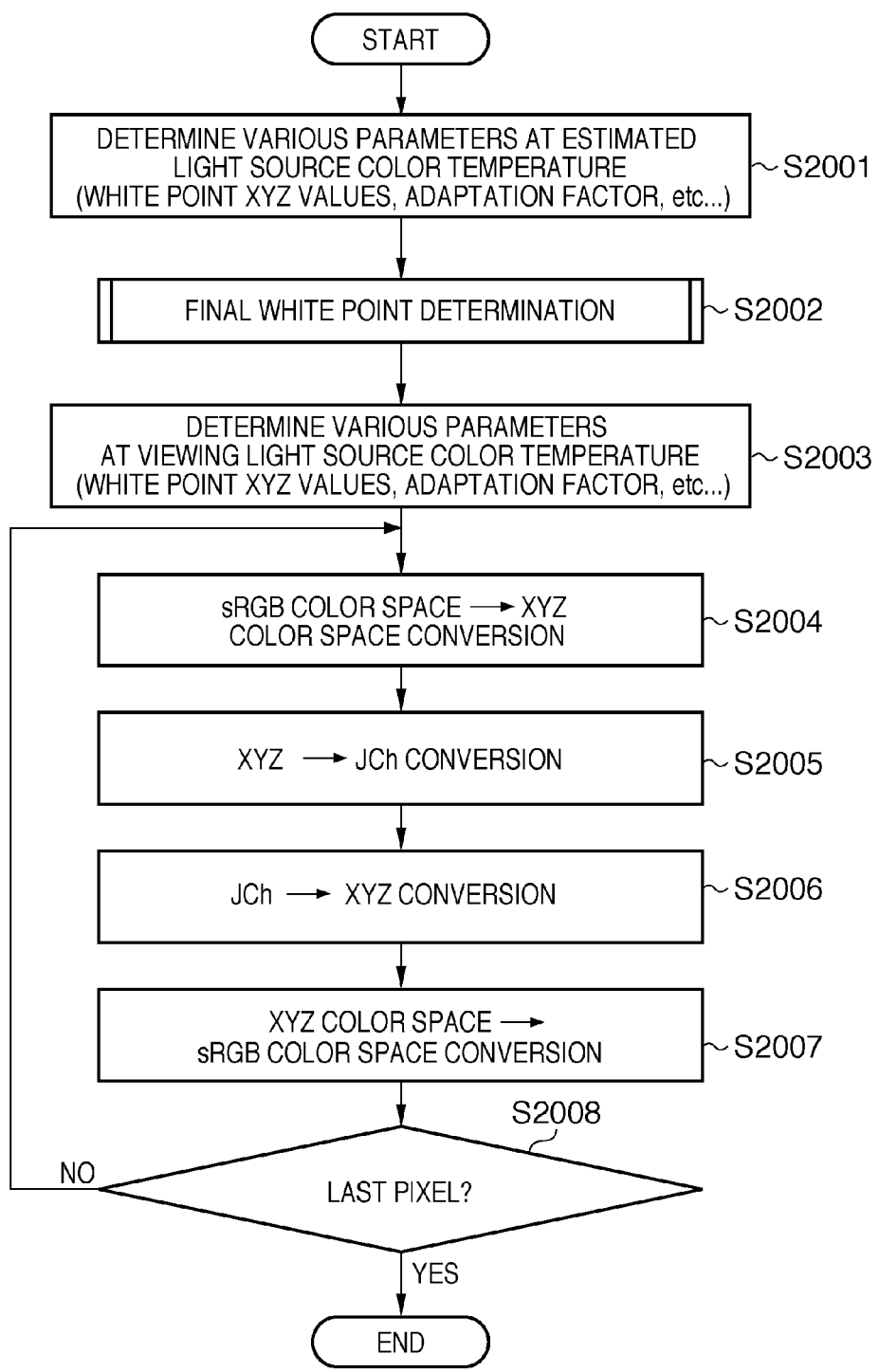
FIG. 12 is a flowchart of a second color conversion unit according to the first embodiment.

FIG. 12 shows the processing sequence by the second color conversion unit 206. The following description will be given along this sequence. Note that this processing is implemented when the CPU 101 reads out and executes a program stored in, for example, the RAM 102 as a storage unit included in the image processing apparatus 100 that can implement the present invention.

Referring to FIG. 12, the second color conversion unit 206 calculates various parameters according to the color temperature of a light source at the time of shooting, which is estimated by the light source estimation unit 204, in step S2001. The parameters mainly include white point XYZ values and an adaptation factor Din under the light source at the time of shooting.

The white point XYZ values are calculated by the following method. That is, as shown in FIG. 13, YCbCr values at principal color temperatures are stored in advance in a storage unit such as the ROM 103. Furthermore, an interpolation operation is made according to the estimated color temperature to calculate a white point (EsY, EsCb, EsCr) corresponding to the color temperature obtained as a result of the light source estimation. For example, when the estimated color temperature is 3750K, since it is intermediate between 2000K and 5500K, white point values (EsY, EsCb, EsCr) are (255, −15, 15).

The calculated white point values (EsY, EsCb, EsCr) can be converted into XYZ values via sRGB space by known formulas. In step S2001, the second color conversion unit 206 also determines the adaptation factor Din under the light source at the time of shooting. The adaptation factor Din may be set to be a pre-set fixed value (for example, Din=0.8). With the processes executed so far, a highlight color based on the estimated light source at the time of shooting is calculated. Based on this calculation result, a first highlight color is determined.

The calculation method of parameters under the estimated light source at the time of shooting has been described. As a point to be considered in this case, the light source estimation result is not always correct. For example, the white point values (EsY, EsCb, EsCr) calculated based on the light source estimation result assume nearly the same values as the HL color (HLY, HLCb, HLCr) calculated by the image analysis unit 202. In this case, since it is determined that the reference white point is correct, the color balance correction can be executed. However, when these values largely deviate from each other, it has to be judged which white point is to be finally used to execute the correction processing.

In consideration of the above problem, this embodiment will explain a method of calculating a final reference white point using both the HL color obtained by the image analysis unit 202 and the white point obtained as a result of the light source estimation in step S2002 in FIG. 12.

Figure 14A:
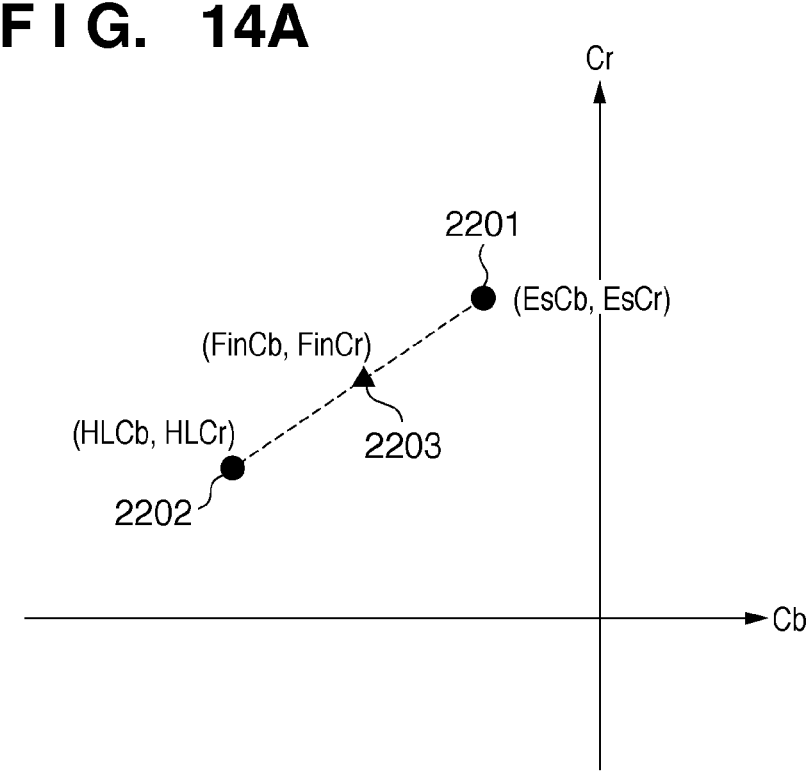
FIGS. 14A and 14B are graphs for explaining processing for determining a final white point according to the present invention.

FIG. 14A depicts the final white point determination method in this embodiment. FIG. 14A shows the Cb-Cr color plane, and also a white point 2201 calculated from the light source estimation result, an HL color 2202 calculated by the image analysis unit 202, and a final white point 2203 calculated from both the white point 2201 and HL color 2202. In this embodiment, as a simplest example, a final white point (FinY, FinCb, FinCr) is calculated by:

$$FinY = (EsY + HLY)/2$$

$$FinCb = (EsCb + HLCb)/2$$

$$FinCr = (EsCr + HLCr)/2 \quad (10)$$

where (EsCb, EsCr) are the coordinates of the white point 2201, and (HLCb, HLCr) are those of the HL color 2202.

Note that the white point 2201 calculated from the light source estimation result corresponds to a first HL color, the HL color 2202 calculated by the image analysis corresponds to a second HL color, and the final white point 2203 which is finally calculated corresponds to a third HL color.

Equations (10) mean that the final white point is set at a middle point between the white point and HL color. The final white point values are converted into XYZ values by known formulas, and the color balance correction (to be described later) is executed using the XYZ values. Using this method, third highlight color calculation processing is executed.

When the color balance correction is executed using the final white point calculated by the above method, a serious adverse effect can be suppressed compared to a case in which the color balance correction is executed using either one of the white point and HL color, thus allowing the stable color balance correction.

Note that in equations (10), the final white point 2203 is set at the middle point between the white point 2201 and HL color 2202 for the sake of simplicity. However, this embodiment is not limited to this. For example, the coordinates of the final white point may be determined using fixed internal division ratios W_a and W_b, which are set in advance, as described by:

$$FinY = EsY \times W\_a + HLY \times W\_b$$

$$FinCb = EsCb \times W\_a + HLCb \times W\_b$$

$$FinCr = EsCr \times W\_a + HLCr \times W\_b \quad (11)$$

When the following constraint condition is used in equations (11), the final white point exists on two line segments.

Constraint condition: $W\_a \geq 0, W\_b \geq 0$, and $W\_a + W\_b = 1.0$

For example, when the processing precision in the light source estimation of the light source estimation unit 204 is relatively reliable, the internal division ratio values are respectively set to be W_a=0.6 and W_b=0.4 to increase a weighting coefficient of the (EsY, EsCb, EsCr) values, so as to determine the final white point. Conversely, when the performance of the light source estimation unit 204 is low, the weighting coefficient of the (EsY, EsCb, EsCr) values may be decreased. That is, the weighting coefficient ratio can be changed according to the processing in the light source estimation of the light source estimation unit 204.

Figure 14B:
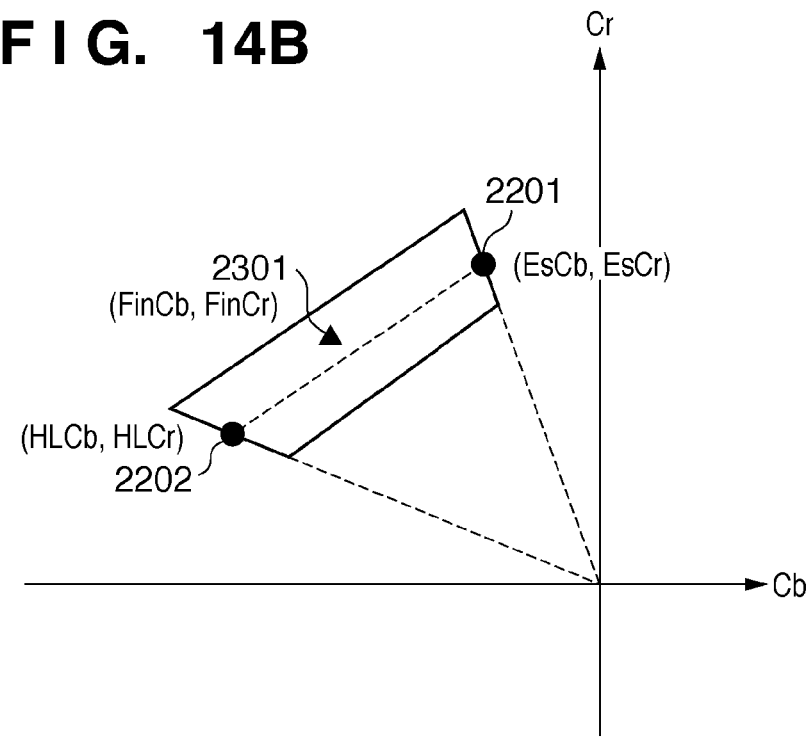

Also, in equations (11), the value (W_a+W_b) need not always be set to be 1.0 as long as it falls within a range that satisfies the effect of the present invention. For example, a constraint condition that (W_a+W_b) falls within a range from 0.9 to 1.1 may be set. In this case, a trapezoidal range 2301 bounded by a solid line, as shown in FIG. 14B, corresponds to an existence range of the final white point.

When the final white point is determined in this way, a serious adverse effect can be suppressed compared to a case in which either of (EsY, EsCb, EsCr) and (HLY, HLCb, HLCr) are used, thus allowing the stable color balance correction. The final white point calculation method in this embodiment has been described.

Subsequently, in step S2003 shown in FIG. 12, the second color conversion unit 206 determines parameters in an viewing environment in which the user views the input image. The viewing environment in this case includes, for example, the monitor 111. As is well known, a white point of sRGB monitor is set to be D65. That is, in case of the YCbCr space, this white point corresponds to (255, 0, 0). By similarly converting these values into XYZ values, the XYZ values in the viewing environment can be obtained. Also, an adaptation factor Dout in the viewing environment can also be determined based on a pre-set fixed value as in the above description.

Note that in the above description, white point coordinates under respective light sources on the YCbCr space are held for the sake of simplicity. However, the present invention is not limited to this. For example, representative coordinates on an XYZ space, sRGB space, or CIE L*a*b* space may be held. The white point coordinates may be expressed by mathematical expressions on a predetermined color space in place of holding representative coordinates. The present invention may use either of these methods.

In step S2004 in FIG. 12, the second color conversion unit 206 converts RGB values (on the sRGB color space in this embodiment) of a pixel of interest of the input image onto the XYZ color space by known conversion formulas. In step S2005, the second color conversion unit 206 converts the XYZ values of the parameters (white point XYZ values, Din) under the light source at the time of shooting, which are calculated in step S2001, onto the JCh color space using conversion formulas described in a known reference of the CIECAM02.

In step S2006, the second color conversion unit 206 converts the JCh values of the parameters (XYZ values of the final white point, Dout) in the viewing environment, which are calculated in step S2003, into X'Y'Z' values using conversion formulas described in a known reference of the CIECAM02. Finally, the second color conversion unit 206 converts the X'Y'Z' values onto the sRGB color space using known conversion formulas to obtain corrected R'G'B' pixel values in step S2007.

The processes in steps S2004 to S2007 are applied to the entire input image while moving the position of the pixel of interest (S2008). With the aforementioned processing, a state approximate to "appearance" viewed at the time of shooting can be reproduced on the monitor as the viewing environment.

Figure 15:
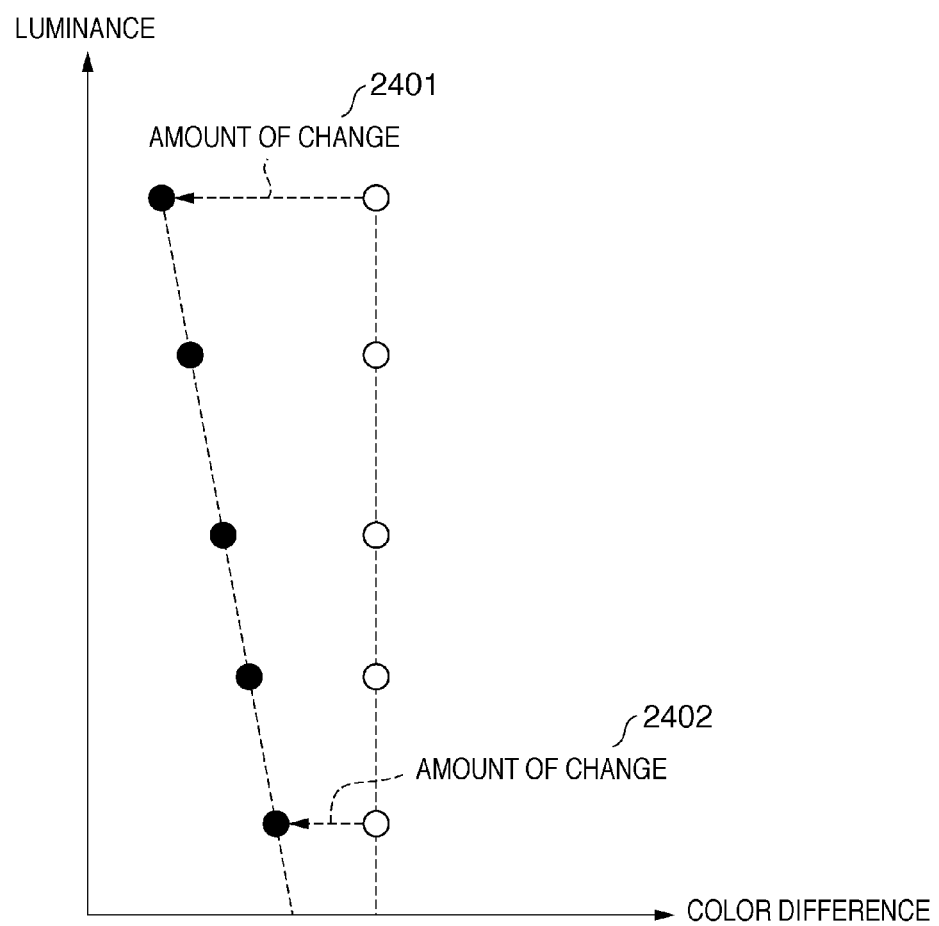
FIG. 15 is a graph for explaining conversion amounts before and after second color conversion according to the present invention.

Features of the image obtained as a result using the aforementioned processing will be described below with reference to FIG. 15. In FIG. 15, the abscissa plots a color difference, and the ordinate plots a luminance value. White dots indicate the gray axis of the image which is input to the second color conversion unit 206 and suffers color fog, and black dots indicate pixel values after the second color conversion processing. Since the white dots suffer white fog, they exist at positions deviating from the luminance axis. As shown in FIG. 15, an amount of change 2402 of pixels on a dark part region side is smaller than an amount of change 2401 of pixels on a bright part region side.

When the aforementioned second color conversion processing is applied to white dot pixels, a white dot axis is corrected toward the luminance axis, that is, in an achromatic color direction due to a human adaptation function, and the correction amount becomes larger for the bright part region (higher-luminance pixels) and becomes smaller for the dark part region (lower-luminance pixels).

That is, paying attention to a plurality of pixels having the same hue values and the same saturation values of input pixel values, an amount of change of the second color conversion becomes larger for brighter pixels than darker pixels. This is based on the human visual characteristics in which the adaptation factor for a bright part is higher than that for a dark part. With this processing, an image more approximate to "appearance" at the time of shooting can be reproduced than the conventional method.

Also, by setting the adaptation factors Din and Dout to be less than 1.0, an imperfect adaptation state which is important in the human visual characteristics can be considered, and an image more approximate to "appearance" at the time of shooting can be reproduced than the conventional method.

As described above, according to this embodiment, even when the first HL color calculated by the light source estimation is different from the second HL color calculated from an image, the third HL color can be calculated using both the HL colors. By executing the color balance correction using the third HL color, even when either one of the first and second HL colors is wrong, the stable color balance correction which suppresses an extreme adverse image effect can be attained. At this time, when the first and second HL colors are relatively close to each other, it is judged that these values are reliable, and a desired color balance correction can be attained.

When the arrangement of the present invention is used, if either of the first and second HL colors is correct, the correction effect may often be weakened upon execution of the correction using the third HL color compared to that using only the correct HL color. However, in recent image capturing apparatuses and output apparatuses such as printers, functions are normally enabled without any user's instructions. In such functions, very high importance is attached to a merit that the user can use these functions at ease since the stable color balance correction is executed without causing any extreme adverse image effects rather than a demerit that the effects are weakened. For this reason, the method of comprehensively calculating the third HL color from the two HL colors like in the present invention has particular effects that the stable color balance correction can be executed while suffering less adverse effects.

Also, the present invention is particularly effective for a nonlinear color balance correction using an HL color. If the color balance correction is a linear conversion, images which undergo color balance corrections respectively using first and second HL colors are prepared, and the two images are then internally divided and composited to have arbitrary weights. However, when the color balance correction processing is nonlinear conversion processing, even when the aforementioned linear composition processing is applied to an image obtained as a result of the nonlinear processing, a desired correction result cannot often be obtained. The present invention is applied to such nonlinear color balance correction to determine a reference white point in advance, and to then execute the color balance correction, thus obtaining a desired output result.

Second Embodiment

This embodiment will explain a method of setting a reliability R_Vec calculated by an image analysis result modification unit 203 while giving still other examples. As a characteristic feature described in the first embodiment, a roughly constant relationship between an HL color and object color is maintained even when a light source is changed. The method of setting the reliability R_Vec based on this characteristic feature will be described below with reference to FIG. 16A.

Figure 16A:
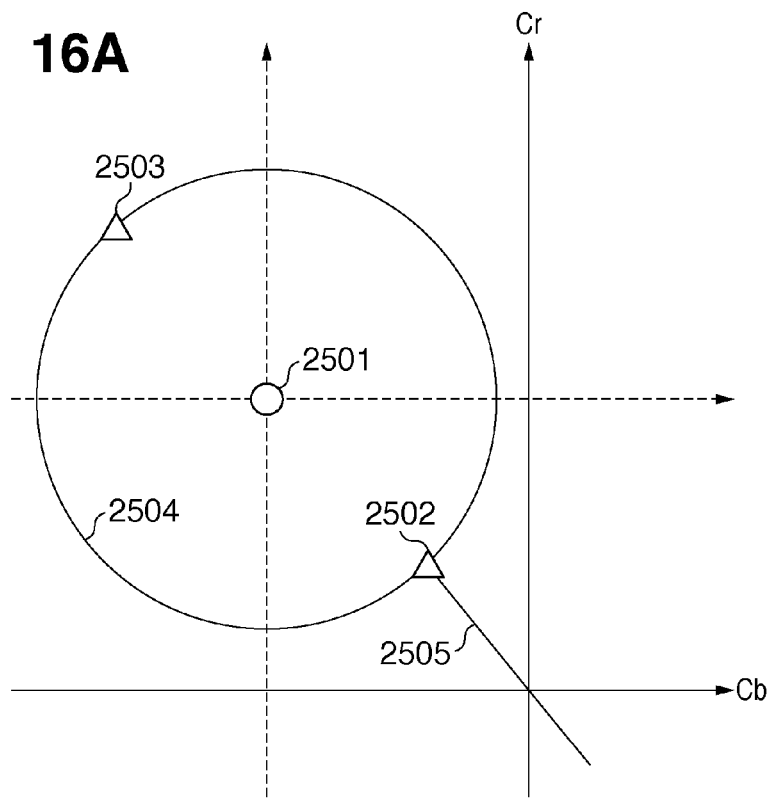
FIGS. 16A and 16B are graphs for explaining an image analysis result modification unit according to the second and third embodiments.

FIG. 16A shows a Cb-Cr plane of a YCbCr space. A reliability is determined to fall within a range from 0 to 1.0. In this case, when an HL color (HLCb, HLCr) is located at coordinates 2502 in the fourth quadrant to have coordinates (ObjCb, ObjCr) of an object color as a skin color as an origin, since it is judged that the positional relationship between the object color and HL color is reliable, a reliability=1 is set. On the other hand, when the HL color is located at coordinates 2503 in the second quadrant, since it is judged that the positional relationship between the object color and HL color are not reliable, a reliability=0 is set.

When the HL color located at the coordinates 2502 in FIG. 16A moves to form a circle 2504 to have the skin color as the coordinates 2501 of the object color as the center, a reliability becomes lower in predetermined decrements as the HL color moves to the first quadrant and further to the second quadrant. On the other hand, likewise, a reliability becomes higher in predetermined increments as the HL color moves to the third quadrant and further to the fourth quadrant.

In the fourth quadrant, when the HL color indicated by the coordinates 2502 in FIG. 16A moves along a straight line 2505 that passes through the coordinates 2501 of the object color and the coordinates 2502 of the HL color, a reliability becomes higher in predetermined increments as the HL color is closer to the coordinates 2501 of the object color. Also, a reliability becomes lower in predetermined decrements as the HL color is farther away from the coordinates 2501.

A range and value of the reliability can be arbitrarily determined. A predetermined color plane or space may be, for example, any of a YCbCr space, YC1C2 space, and CIE L*a*b* space.

As described above, the reliability can be further defined, and the same effects as in the first embodiment can be obtained.

Third Embodiment

The first embodiment has explained the processing executed when an image analysis result modification unit 203 erroneously detects a first HL color. This embodiment will explain processing executed when the image analysis result modification unit 203 erroneously detects a first object color, with reference to FIG. 16B.

In the first embodiment, when a calculated reliability R_Vec is high, and a calculated face detection reliability R_face is low, this means that an object color is more likely to be erroneously detected, or an HL color and object color are more likely to be erroneously detected.

When a detection error is more likely to occur, a proper light source at the time of shooting cannot be estimated, and the color balance of image data may be largely broken. Hence, an erroneously detected value has to be modified by weighting it based on the obtained reliability. The reliability may be equivalent to the weighting coefficient. At this time, both the object color and HL color may be modified or only the object color may be modified.

Since a possibility of erroneous detection increases with decreasing reliability R_Vec or face detection reliability R_face, the correction effect has to be weakened. In order to weaken the correction effect, it is desired to use an HL color and object color under a daylight light source as a white reference upon setting a reference HL color (b_HLCb, b_HLCr) and reference object color (b_ObjCb, b_ObjCr). In this embodiment, a white point under the daylight light source is set as the reference HL color, and a human skin color under the daylight light source is set as the reference object color. However, the reference HL color and reference object color may be freely set.

An example in which at least one of an object color and HL color is modified based on the reliability R_Vec and face detection reliability R_face will be described below. As described in the first embodiment as well, a detected HL color (HLCb, HLCr) will be referred to as a first HL color (f_HLCb, f_HLCr), and a modified HL color will be referred to as a second HL color (s_HLCb, s_HLCr). Likewise, a detected object color (ObjCb, ObjCr) will be referred to as a first object color (f_ObjCb, f_ObjCr), and a modified object color will be referred to as a second object color (s_ObjCb, s_ObjCr). The second object color can be expressed by:

$$s\_ObjCb = b\_ObjCb + (f\_ObjCb - b\_ObjCb) \times R\_Vec \times R\_face$$

$$s\_ObjCr = b\_ObjCr + (f\_ObjCr - b\_ObjCr) \times R\_Vec \times R\_face \quad (12)$$

The second HL color can be expressed by:

$$s\_HLCb = b\_HLCb + (f\_HLCb - b\_HLCb) \times R\_Vec \times R\_face$$

$$s\_HLCr = b\_HLCr + (f\_HLCr - b\_HLCr) \times R\_Vec \times R\_face \quad (13)$$

Equations (12) and (13) include the reliability R_Vec and face detection reliability R_face.

Figure 16B:
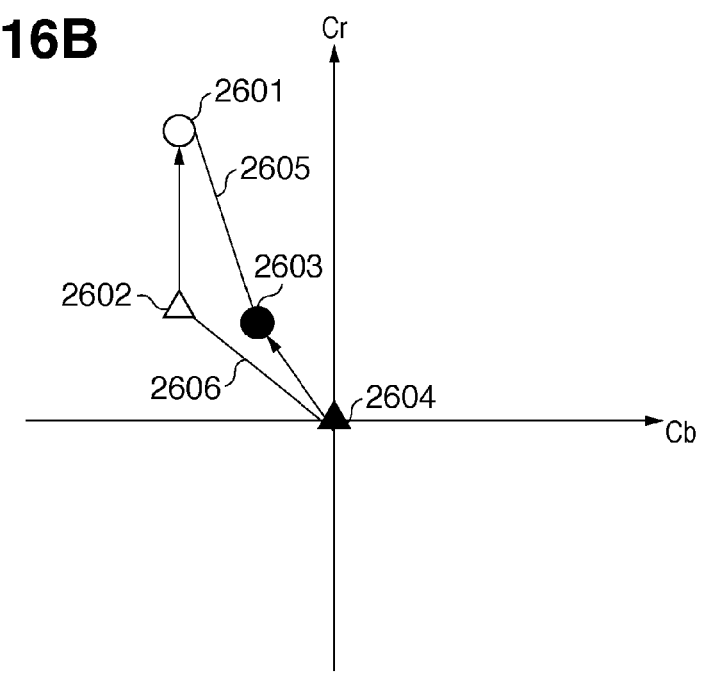

FIG. 16B shows a first object color 2601, first HL color 2602, reference object color 2603, and reference HL color 2604 on a Cb-Cr plane of a YCbCr space. In this case, as a result of equations (12) and (13), the second object color is located on a straight line 2605 which connects the reference object color and first object color, and the second HL color is located on a straight line 2606 which connects the reference HL color and first HL color.

In this case, a predetermined color plane or space may be, for example, any of a YCbCr space, YC1C2 space, and CIE L*a*b* space. The calculation methods of the second HL color and second object color in the present invention are not limited to the above equations.

Fourth Embodiment

In the first embodiment, an image analysis unit 202 calculates an HL color (HLY, HLCb, HLCr) in final white point determination processing in step S2002 in FIG. 12. Then, the first embodiment has explained that a final white point is set at a middle point between the calculated HL color and a white point (EsY, EsCb, EsCr) obtained from a light source estimation result. However, the present invention is not limited to this.

For example, the final white point can be determined using a light source estimation reliability R_lse (=0 to 1.0) described in the first embodiment by:

$$FinY = EsY \times R\_lse + HLY \times (1.0 - R\_lse)$$

$$FinCb = EsCb \times R\_lse + HLCb \times (1.0 - R\_lse)$$

$$FinCr = EsCr \times R\_lse + HLCr \times (1.0 - R\_lse) \quad (14)$$

When a face is successfully detected, a skin color is estimated accurately. In this case, the final white point can also be determined using a weighting coefficient W_mix that additionally considers a face detection reliability R_face.

$$FinY = EsY \times W\_mix + HLY \times (1.0 - W\_mix)$$

$$FinCb = EsCb \times W\_mix + HLCb \times (1.0 - W\_mix)$$

$$FinCr = EsCr \times W\_mix + HLCr \times (1.0 - W\_mix) \quad (15)$$

In equations (15), the weighting coefficient W_mix is given by:

$$W\_mix = (R\_face + R\_lse) / 2.0 \quad (16)$$

Equation (16) expresses that importance is attached to (EsY, EsCb, EsCr) when both the light source estimation reliability and face detection reliability are high, and is attached to (HLY, HLCb, HLCr) when either reliability is low.

As described above, according to this embodiment, the final white point is adaptively calculated for each image by weighting using the light source estimation reliability and face detection reliability. Thus, when the light source estimation reliability and face detection reliability are high, importance is consequently attached to (EsY, EsCb, EsCr). As a result, a highly stable color balance correction which suppresses crucial detection errors can be attained compared to the conventional method.

Fifth Embodiment

In the fourth embodiment, a final white point is determined as an internally divided point by multiplying (EsY, EsCb, EsCr) and (HLY, HLCb, HLCr) by predetermined weighting coefficients. This embodiment will explain, as another method, a method of determining, as a final white point, a white point which improves a skin color detected by an object detection unit 302.

Figure 17:
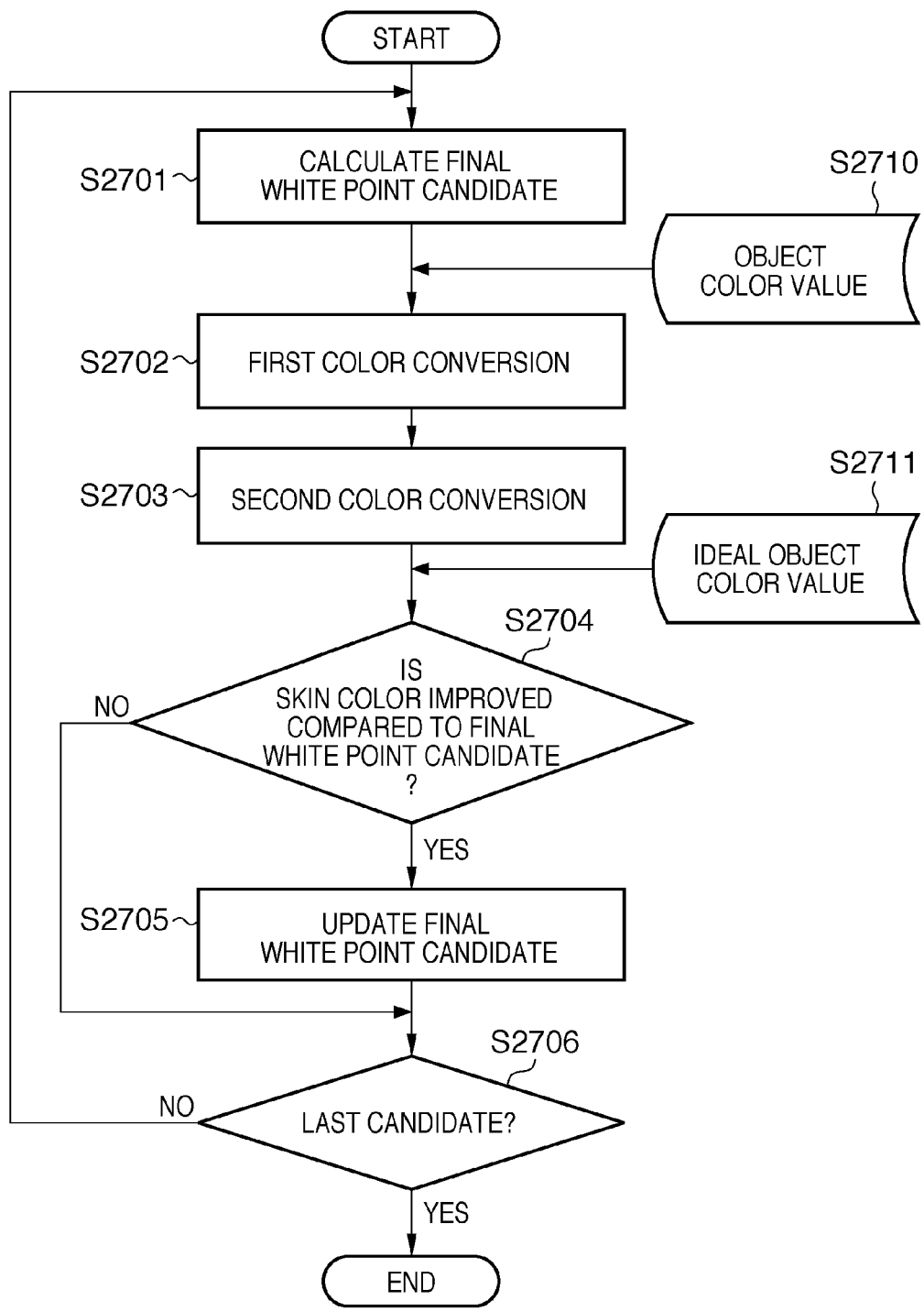
FIG. 17 is a flowchart of processing for determining a final white point according to the fifth embodiment.

FIG. 17 shows details of final white point determination processing in step S2002 in FIG. 12. The sequence will be described below with reference to FIG. 17. This processing sequence is implemented when a CPU 101 reads out and executes a program stored in, for example, a ROM 103 as a storage unit included in an image processing apparatus 100 to which this embodiment is applicable. In FIG. 17, a second color conversion unit 206 calculates an N-th final white point candidate (CanY(N), CanCb(N), CanCr(N)) in step S2701. A candidate point as a highlight color candidate is calculated by:

CanY(N)=EsY×W_can(N)+HLY×(1.0−W_can(N))

CanCb(N)=EsCb×W_can(N)+HLCb×(1.0−W_can(N))

Figure 18A:
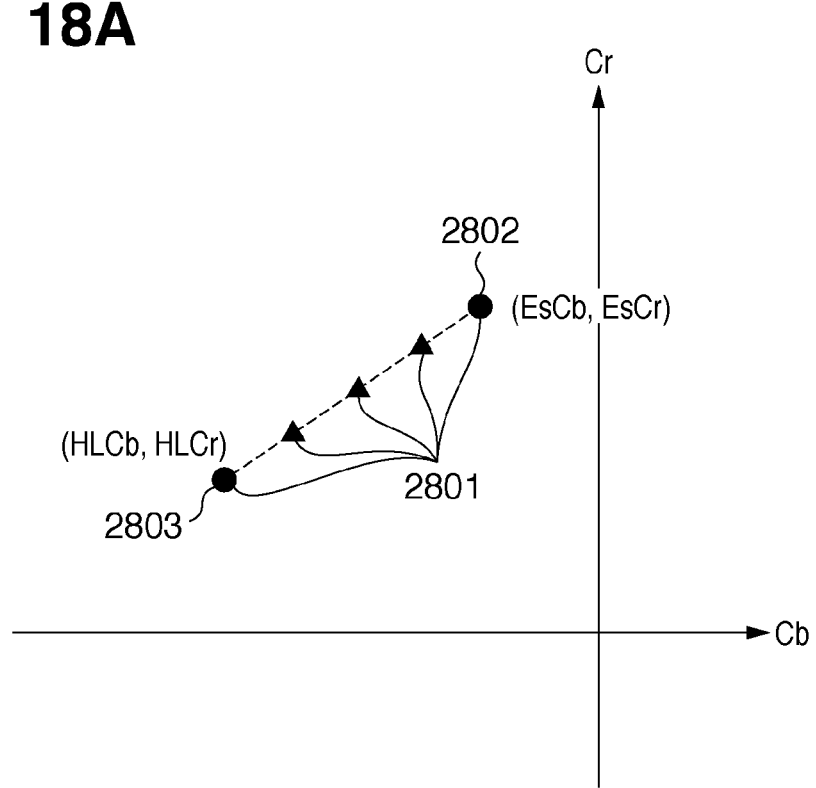
FIGS. 18A and 18B are graphs of processing for determining a final white point according to the fifth embodiment.

CanCr(N)=EsCr×W_can(N)+HLCr×(1.0−W_can(N))   (17)

where W_can(N) is a weighting coefficient which increases from 0.0 to 1.0 in increments of 1/N, and the N-th candidate point means that (EsY, EsCb, EsCr) and (HLY, HLCb, HLCr) are internally divided to have W_can(N) as the weighting coefficient. For example, when N=4, since W_can increases in increments of 0.25, candidate points in this case include five candidate points indicated by candidate points 2801 shown in FIG. 18A. In this way, highlight color candidate calculation processing is executed.

In steps S2702 and S2703, a first color conversion unit 205 and the second color conversion unit 206 apply first and second color conversions to an object color (ObjY, ObjCb, ObjCr) using the calculated N-th white point candidate point. These processes implement a candidate correction unit as corrections for the object color using respective highlight color candidates. Note that the first and second color conversions are the same as those described in the first embodiment, and a detailed description thereof will not be given.

In step S2702, the first color conversion unit 205 applies the first color conversion to (ObjY, ObjCb, ObjCr) using a white point (CanY(N), CanCb(N), CanCr(N)) as an object color value 2710 to obtain (ObjY', ObjCb', ObjCr'). In step S2703, the second color conversion unit 206 applies the second color conversion to (ObjY', ObjCb', ObjCr') similarly using the N-th white point candidate to obtain (ObjY", ObjCb", ObjCr"). Note that upon execution of the second color conversion, luminance and color difference signals (YCbCr) are required to be converted into XYZ values. However, such conversion can be implemented by known formulas, and a detailed description thereof will not be given.

Figure 18B:

It is checked in step S2704 whether or not the object color (ObjY", ObjCb", ObjCr") after the second color conversion processing is improved compared to the object color (ObjY, ObjCb, ObjCr) before the color conversion. In this embodiment, assume that an image processing apparatus holds, in advance, ideal object color values 2711 as ideal object color information used in the checking processing. FIG. 18B shows the ideal object color values 2711. FIG. 18B shows the Cb-Cr color plane, and also that an object color 2901 assumes ideal values (IdeCb, IdeCr). As a characteristic feature described above, when an object is a human face color, lightness values of human skin colors are different depending on races, but skin colors have small differences depending on races. Hence, an ideal color can be determined in advance in this way.

In step S2705, distance between the object colors before and after the color conversion and the ideal object color are calculated. The following equations can be used as calculation formulas to be used in distance calculations, D_org is the distance between the object color before the conversion and the ideal object color, and D_n is the distance between the object color after the color conversion, which is calculated using the N-th white point candidate, and the ideal object color:

D_org=sqrt(SQ(ObjCb−IdeCb)+SQ(ObjCr−IdeCr))

D_n=sqrt(SQ(ObjCb"−IdeCb)+SQ(ObjCr"−IdeCr))   (18)

where SQ(x) is a square of x, and sqrt(x) is a square root of x.

In step S2706, two checking process are executed using D_org and D_n. The following two conditions are defined.

Condition 1: D_n<D_org

Condition 2: D_min>D_n where D_min is a minimum value of D_n.

If condition 1 is not satisfied, this means that the distance to the ideal object color is increased as a result of the color conversion, and the N-th white point candidate is excluded from the candidates. If condition 1 is satisfied, a determination is made based on condition 2. If condition 2 is satisfied, in step S2705 the current white point candidate can optimize the object color, D_n is set in D_min, and the current white point candidate is set in the final white point (FinY, FinCb, FinCr). That is, this process is defined by:

FinY=CanY(N)

FinCb=CanCb(N)

FinCr=CanCr(N)   (19)

When the processes in steps S2701 to S2706 are executed for all the white point candidate points, a white point candidate which can optimize the object color is consequently stored in (FinY, FinCb, FinCr) as the final white point. These processes implement a third highlight color determination unit. The processing sequence of FIG. 17 has been described.

As described above, according to this embodiment, upon determining the final white point, a candidate point which optimizes a human face color of a plurality of candidate points obtained from both (EsY, EsCb, EsCr) and (HLY, HLCb, HLCr) is determined as the final white point. As a result, a highly stable color balance correction which suppresses crucial correction errors can be attained compared to the conventional method.

Note that in this embodiment, only one point on the Cb-Cr color plane is set as the ideal object color for the sake of simplicity. However, the present invention is not limited to this. For example, an ideal object color may be set on the Cb-Cr color plane as a region in place of a point, and it may be checked in step S2704 whether or not the object colors after the first and second color conversions approach that region. Even this case is incorporated in the scope of the present invention.

Sixth Embodiment

Figure 19:
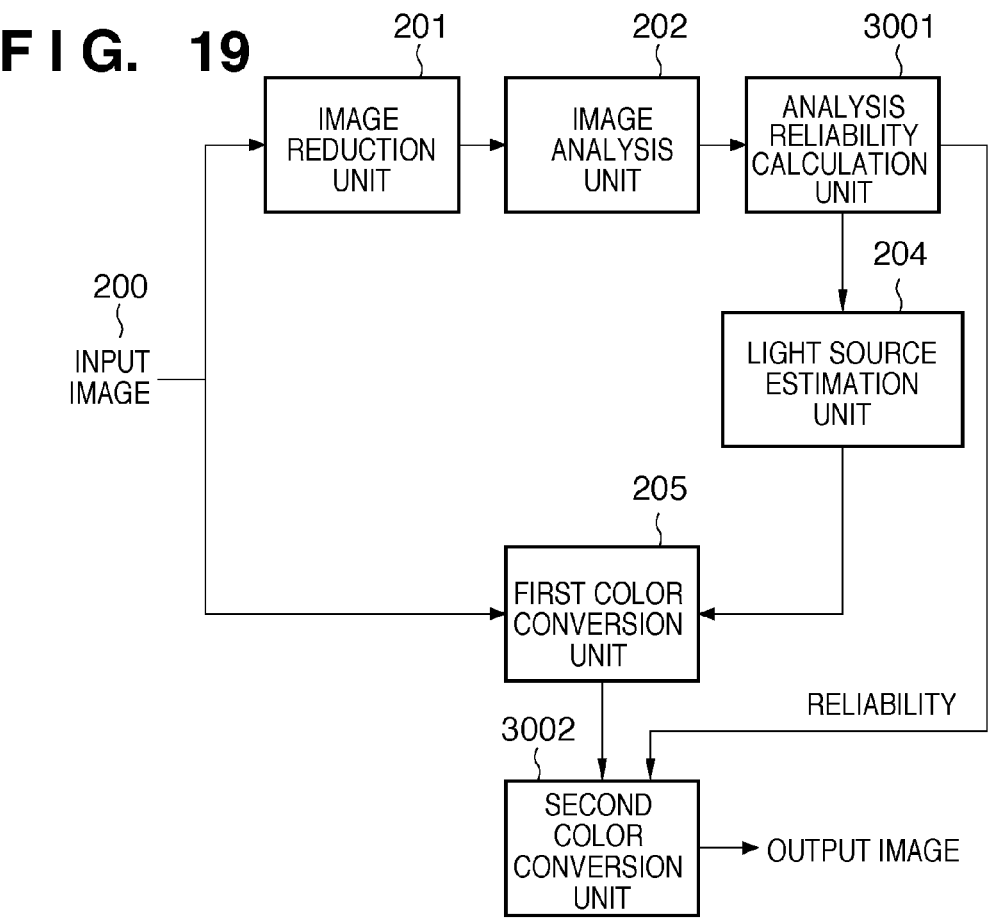
FIG. 19 is a functional block diagram according to the sixth embodiment.

In the examples of the embodiments described so far, a color balance correction strength is suppressed by modifying an analysis result by an image analysis result modification unit 203. However, the present invention is not limited to this. In this embodiment, an analysis reliability calculation unit 3001 is newly added, as shown in the block diagram of FIG. 19. A case will be described below wherein the analysis reliability calculation unit 3001 calculates a reliability of the analysis result, this reliability is used as a correction value in a color balance correction, and a second color conversion unit 3002 changes a color balance correction strength (color conversion ratio). Note that units shown in FIG. 19 except for the analysis reliability calculation unit 3001 and second color conversion unit 3002 perform the same operations as in the first embodiment, and a detailed description thereof will not be given.

(Analysis Reliability Calculation Unit 3001)

Figure 20:
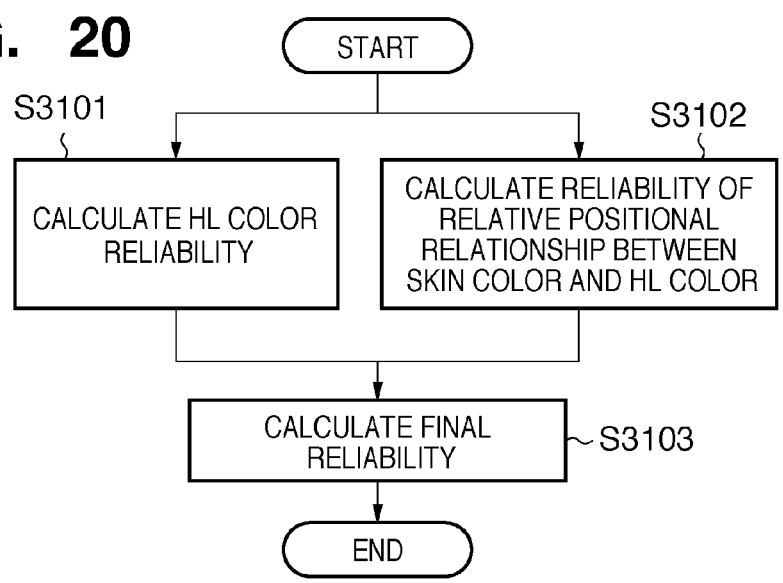
FIG. 20 is a flowchart of processing for calculating a reliability according to the sixth embodiment.

FIG. 20 shows the processing sequence of the analysis reliability calculation unit 3001. This processing sequence is implemented when a CPU 101 reads out and executes a program stored in, for example, a ROM 103 as a storage unit included in an image processing apparatus 100 which can implement this embodiment. Referring to FIG. 20, the analysis reliability calculation unit 3001 calculates a reliability of an HL color analyzed by an image analysis unit 202 in step S3101. In step S3102, the analysis reliability calculation unit 3001 calculates a reliability of a relative positional relationship between the HL color and an object color (human skin color) analyzed by the image analysis unit 202. FIG. 20 shows that the processes in steps S3101 and S3102 are parallelly processed. However, these processes may be executed in a predetermined order so that one of these processes is executed first, and the other process is then executed. Finally, in step S3103 the analysis reliability calculation unit 3001 calculates a final reliability using the reliabilities obtained from both the processes in steps S3101 and S3102.

In this embodiment, the analysis reliability calculation unit 3001 calculates a reliability of HL color values HLCb and HLCr of an input image, which are calculated by the image analysis unit 202, using an HL color blackbody locus based on a spectral distribution, which is held in advance, in step S3101. Assume that a method of calculating the reliability of color difference component values HLCb and HLCr of the HL color of the input image using the HL color blackbody locus in this embodiment uses that of a reliability R_dis which has been described using FIGS. 5 and 6 of the image analysis result modification unit 203. Since the reliability calculation method makes the same operations as in the first embodiment, a detailed description thereof will not be given.

In step S3102, the analysis reliability calculation unit 3001 calculates a reliability R_Vec based on a relative positional relationship between the object color and HL color. As the calculation method, a method of expressing the relationship between the object color and HL color as a vector and calculating the reliability using the vector, and a method of determining the reliability R_Vec based on ratios of a distance and angle of the object color and HL color, as described in the first embodiment, are available. Also, when the object color is calculated using face detection, a method of determining the reliability R_Vec in consideration of a ratio between a face detection reliability R_face and the reliability R_Vec, as described in the third embodiment, is also available.

In step S3103, the analysis reliability calculation unit 3001 calculates a final reliability R_fin as a final reliability from the reliability R_dis calculated in step S3101 and the reliability R_Vec calculated in step S3102. A method of calculating the final reliability R_fin will be described below. In this embodiment, the final reliability R_fin is calculated by multiplying the reliability R_dis and reliability R_Vec:

$$R\_fin = R\_dis \times R\_Vec \qquad (20)$$

For example, when the reliability R_dis is 0.2, and the reliability R_Vec is 0.5, the final reliability R_fin is calculated as follows:

$$R\_fin = 0.2 \times 0.5 = 0.1$$

In this embodiment, the final reliability R_fin is calculated by multiplying the reliability R_dis and reliability R_Vec. However, the present invention is not limited to this. As another method, for example, a value obtained by adding the reliability R_dis and reliability R_Vec and dividing the sum by 2 is calculated as the final reliability.

$$R\_fin = (R\_dis + R\_Vec)/2 \qquad (21)$$

When conditions are the same as those of the reliability R_dis and reliability R_Vec in the above example, the final reliability R_fin is calculated as follows:

$$R\_fin = (0.2 + 0.5)/2 = 0.35$$

As still another method, for example, as the calculation method of the final reliability R_fin, a value obtained by adding weighted reliabilities and dividing the sum by 2 is calculated as the final reliability:

$$R\_fin = (R\_dis \times W\_dis + R\_Vec \times W\_Vec)/2 \qquad (22)$$

When conditions are the same as those of the reliability R_dis and reliability R_Vec in the above example, and when a weighting coefficient W_dis of the reliability R_dis is 1.0, and a weighting coefficient W_Vec of the reliability R_Vec is 0.2, the final reliability R_fin is calculated as follows:

$$R\_fin = (0.2 \times 1.0 + 0.5 \times 0.2)/2 = 0.15$$

As yet another method, for example, a lower reliability of the reliability R_dis and reliability R_Vec is calculated as the final reliability.

$$R\_fin = (\text{lower one of } R\_dis \text{ and } R\_Vec) \qquad (23)$$

When conditions are the same as those of the reliability R_dis and reliability R_Vec in the above example, the final reliability R_fin is calculated as follows:

Final reliability $R\_fin = 0.2$

As described above, the analysis reliability calculation unit 3001 calculates the final reliability R_fin using the reliability R_dis of the HL color and reliability R_Vec of the relative positional relationship between the skin color and HL color.

(Second Color Conversion Unit 3002)

The final reliability R_fin calculated by the aforementioned processing is input to the second color conversion unit 3002, which suppresses the color balance correction strength according to the reliability. In the color balance correction, the second color conversion unit 3002 calculates (Y, Cb, Cr) values of a reference white point based on a color temperature value obtained as a result of the light source estimation with respect to respective pixel values (R, G, B) of an input image, as described in the first embodiment. Then, the second color conversion unit 3002 applies CIECAM02 based on the white point information to obtain (R', G', B') values after the color balance correction.

In this embodiment, at the time of the color balance correction, final white point values (Y_fin, Cb_fin, Cr_fin) are calculated using the final reliability R_fin as a weighting coefficient for the white point information. Then, the color balance correction is executed using the final white point. A method of controlling this correction amount will be described below. In this embodiment, the final white point is calculated by:

$$Y\_fin = 255 - (255 - Y) \times R\_fin$$

$$Cb\_fin = Cb \times R\_fin$$

$$Cr\_fin = Cr \times R\_fin \qquad (24)$$

In equations (24), when R_fin=1.0, the final white point is the white point itself obtained as a result of the light source estimation. On the other hand, when R_fin=0.0, the final white point is (Y, Cb, Cr)=(255, 0, 0). In the latter case, the color balance correction does not operate in practice, and the correction amount becomes zero in effect.

In this manner, by controlling the reference white point of the color balance correction using the final reliability R_fin calculated by the analysis reliability calculation unit 3001, the correction amount can be suppressed when the final reliability R_fin is low.

In the present invention, by applying R_fin as a weighting coefficient to values before and after the color balance correction in place of the white point, the correction amount may be suppressed. In this case, output values (R", G", B") after suppression are obtained by:

$$R''=R'-(R'-R)\times R\_\text{fin}$$

$$G''=G'-(G'-G)\times R\_\text{fin}$$

$$B''=B'-(B'-B)\times R\_\text{fin} \quad (25)$$

Seventh Embodiment

In the examples of the embodiments described so far, first color conversion processing is applied to an input image, and second color conversion processing is then applied, as shown in FIG. 2A. However, when different processes are connected in series, and each process executes complicated arithmetic processing for respective pixels, a long processing time is required.

Figure 21:
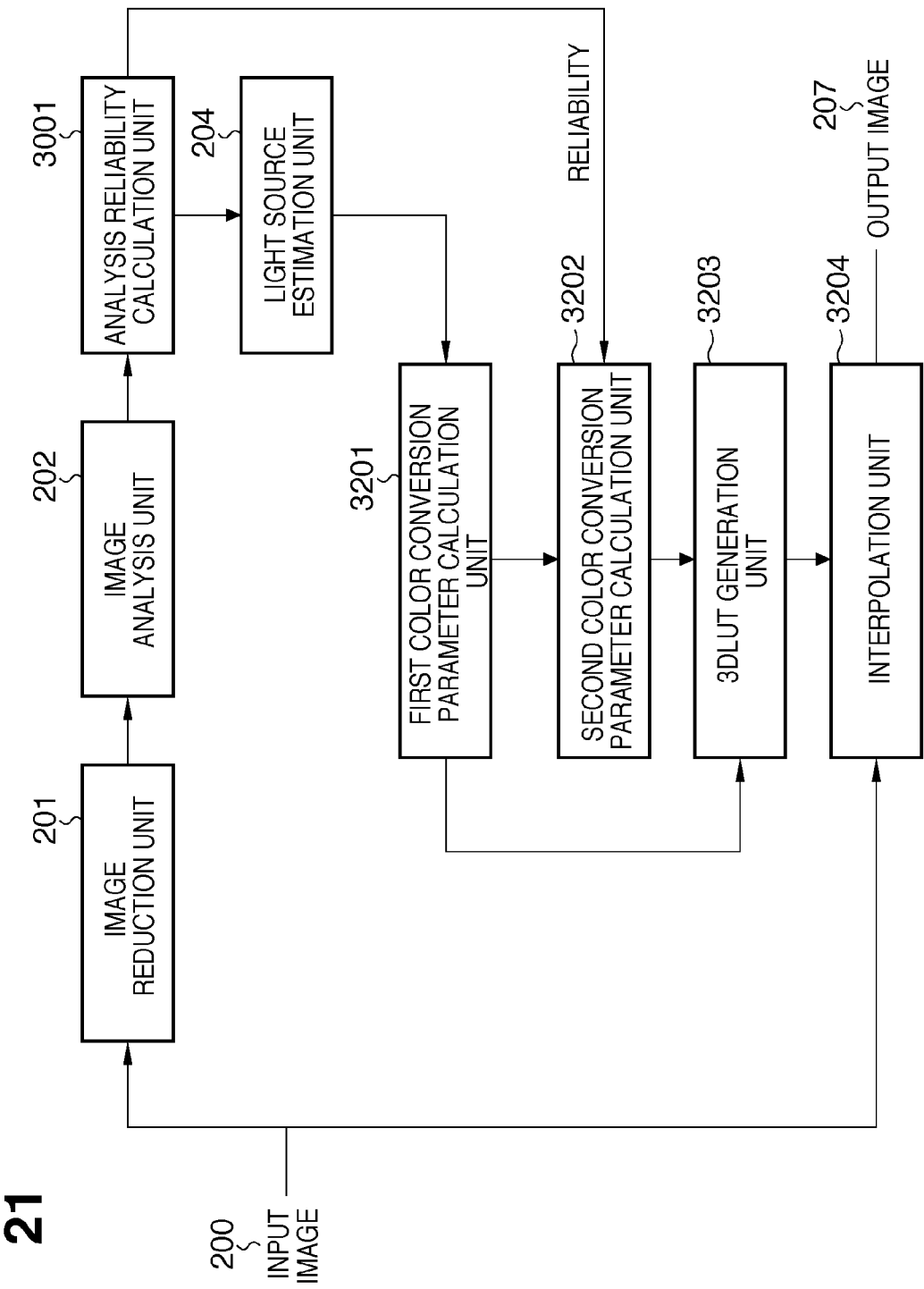
FIG. 21 is a functional block diagram according to the seventh embodiment.

Hence, this embodiment proposes that the processes are executed by the arrangement shown in the block diagram of FIG. 21. That is, this embodiment proposes a method in which parameters required for the first and second color conversions are calculated in advance, a three-dimensional lookup table (to be abbreviated as a 3DLUT hereinafter) which reflects these parameters is calculated, and the 3DLUT is applied to an input image using interpolation calculations. Note that the functional blocks shown in FIG. 21 are the same as the contents described in the first to sixth embodiments except for components 3201 to 3204, and a description thereof will not be repeated.

A first color conversion parameter calculation unit 3201 determines image processing parameters which are the same as those described in the first embodiment, and are required to cancel a WB correction inside a camera. According to the first embodiment, an inverse conversion set (r_max, g_max, b_max) corresponding to the maximum number of gray/skin color pixels adjacent to a blackbody locus calculated by a light source estimation unit 204 is determined as the image processing parameters intact, and the determined parameters are input to a 3DLUT generation unit 3203.

Next, a second color conversion parameter calculation unit 3202 determines parameters which are the same as those described in the first embodiment and are required for the second color conversion. The parameters required for the second color conversion include those associated with a light source at the time of shooting (white point XYZ values at an estimated color temperature, and an adaptation factor Din) and those associated with a viewing environment (white point XYZ values in the viewing environment, and an adaptation factor Dout). These parameters are calculated by the method of controlling a reference white point using a final reliability R_fin calculated by an analysis reliability calculation unit 3001 in the same manner as those described in the sixth embodiment, and are input to the 3DLUT generation unit 3203.

The processing of the 3DLUT generation unit 3203 will be described below with reference to the flowchart shown in FIG. 22. Note that this embodiment generates a 3DLUT including RGB components for 17 grids on sRGB space (the total number of grids is 17^3=4913 grids) for the sake of simplicity. However, the present invention is not limited to this. This processing sequence is implemented when a CPU 101 reads out and executes a program stored in, for example, a ROM 103 as a storage unit included in an image processing apparatus 100 which can implement this embodiment.

Figure 22:
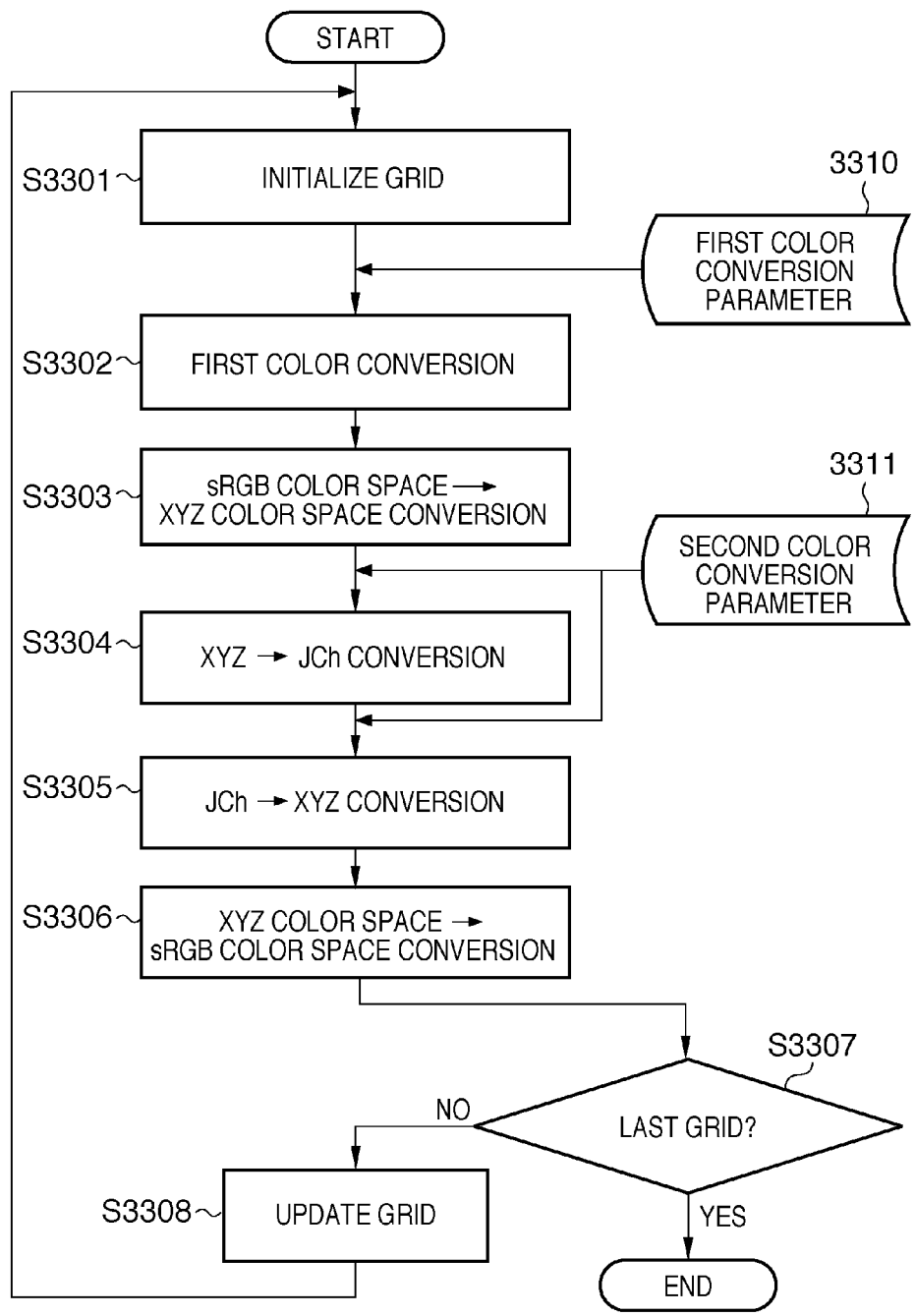
FIG. 22 is a flowchart of a 3D LUT generation unit according to the seventh embodiment.

Referring to FIG. 22, the 3DLUT generation unit 3203 initializes respective grids first in step S3301. That is, the 3DLUT generation unit 3203 resets respective R, G, and B values to zero. In step S3302, the 3DLUT generation unit 3203 executes the first color conversion using first color conversion parameters 3310. More specifically, the 3DLUT generation unit 3203 calculates R'G'B' values after the first color conversion using:

$$R'=R\times r\_\text{max}$$

$$G'=G\times g\_\text{max}$$

$$B'=B\times b\_\text{max} \quad (26)$$

Next, the 3DLUT generation unit 3203 converts the calculated R'G'B' values into XYZ values using known conversion formula in step S3303. The 3DLUT generation unit 3203 converts the XYZ values into values on a JCh space using CIECAM02 in step S3304, as described in the first embodiment, and inversely converts the JCh values into values on an XYZ space in step S3305. Second color conversion parameters 3311 are used in this case.

In step S3306, the 3DLUT generation unit 3203 converts the XYZ values after the second color conversion into values on the sRGB color space, and stores these values in the 3DLUT as an output value of a current grid of interest. The 3DLUT generation unit 3203 repeats the above processes for all the grids of RGB components, and stores output values of the respective grids in the 3DLUT.

Upon completion of the processes in steps S3302 to S3306 (NO in step S3307), the 3DLUT generation unit 3203 increments a B component value by 16 in step S3308. If the B component value exceeds 255, the 3DLUT generation unit 3203 increments a G component value by 16, and resets the B component value to zero, thus continuing the processing. Furthermore, if the G component value exceeds 255, the 3DLUT generation unit 3203 increments an R component value by 16, and resets the G and B component values to zero. In case of the 17-grid 3DLUT, the aforementioned processing is repeated 4913 times. When all the RGB component values exceed 255, the 3DLUT generation unit 3203 determines that the calculation processing of output values for all the grids is complete (YES in step S3307), thus ending the processing.

The 3DLUT generated by the above processing is input to an interpolation unit 3204, which can obtain a corrected image using a known interpolation method (a detailed description of which will not be given) for an input image. The 3DLUT is held in a storage unit such as a RAM 102, and is read out as needed when it is used. As for the interpolation method, various methods such as tetrahedral interpolation and cubic interpolation are available. In the present invention, any of these methods may be used.

As described above, according to this embodiment, output values are calculated using the first and second color conversion parameters, which are calculated in advance, for limited grid positions on the sRGB color space, and are held as the 3DLUT. By converting an input image by interpolation calculations using the 3DLUT, an output image can be obtained within a very shorter processing time than that of complicated color conversion processing for respective pixels, especially when an input image resolution is high.

Note that the first color conversion parameter calculation unit 3201 of this embodiment may execute processing using a shift vector described in the third embodiment. That is, the shift vector value is input to the 3DLUT generation unit 3203, which implements color shift processing in step S3302 in the 3DLUT generation unit 3203 by the same method as in the third embodiment.

This embodiment has described the processing for generating the 3DLUT premised on three RGB components for the sake of simplicity. However, the present invention is not limited to this. For example, according to this embodiment, if an input image format includes four CMYK components, processing may be executed using a four-dimensional LUT. That is, processing executed using the multi-dimensional LUT is also included in the scope of the present invention.

Figure 23:
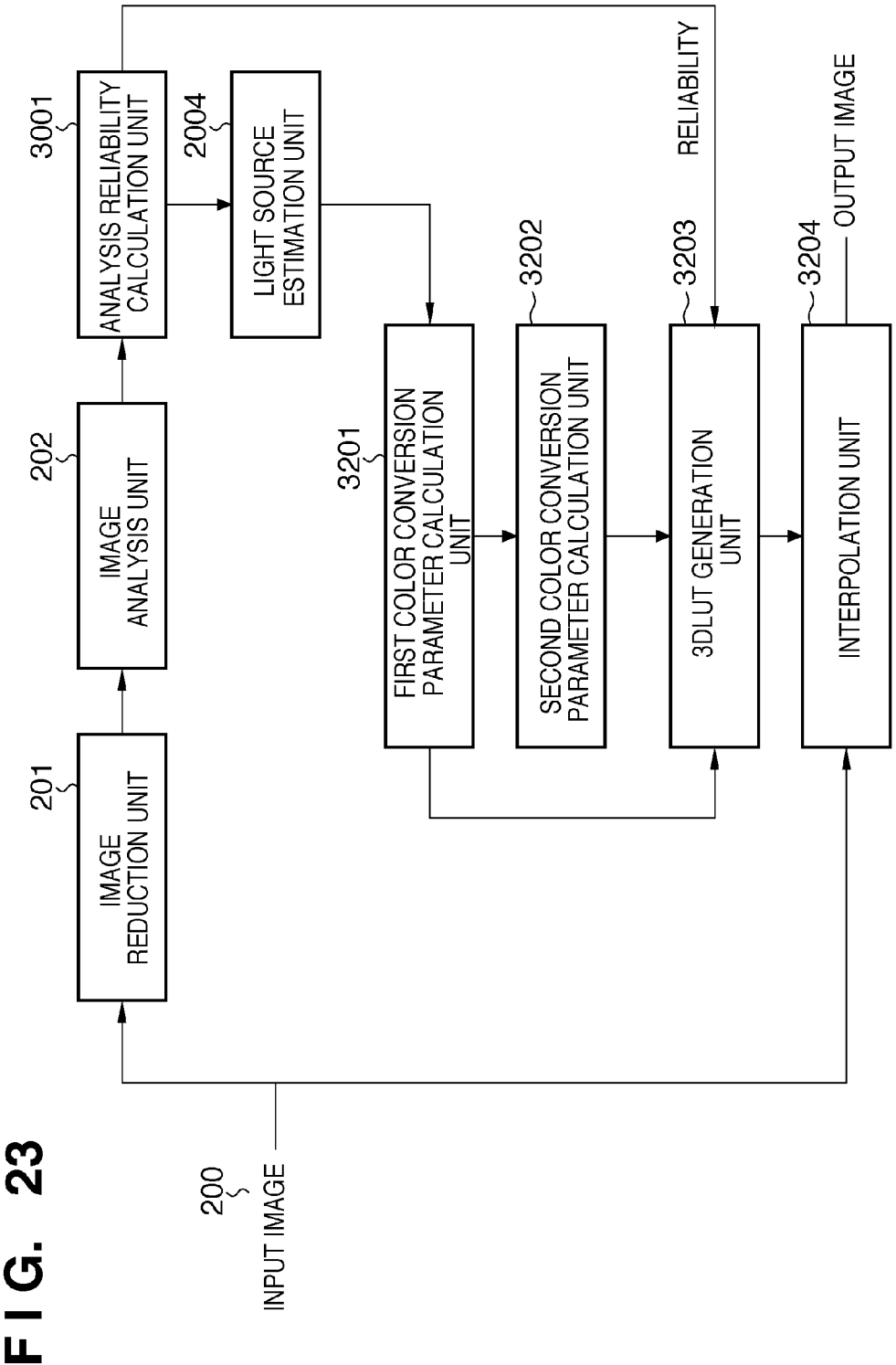
FIG. 23 is a functional block diagram according to the seventh embodiment.

As another embodiment, as shown in FIG. 23, a reliability calculated by the analysis reliability calculation unit 3001 is input to the 3DLUT generation unit 3203. The 3DLUT generation unit 3203 controls correction amounts of the color balance correction of respective grids of the 3DLUT, thus implementing the present invention.

Other Embodiments

The first embodiment has explained the two methods of modifying image feature amounts calculated by the image analysis unit 202, that is, the method of modifying an HL color based on the distance between the blackbody locus and HL color, and the method of modifying one or both of an object color and the HL color based on the relative relationship between the object color and HL color. However, the present invention need not always use both of these methods. Even when one of these methods is used, such modification is incorporated within the scope of the present invention.

In the method described in the sixth embodiment, the analysis reliability calculation unit 3001 calculates the two reliabilities R_Vec and R_dis, and then calculates the final reliability R_fin using the two reliabilities. However, the present invention is not limited to this. The final reliability R_fin may be determined based on either value, and such modification is included within the scope of the present invention.

The color balance correction in the second color conversion unit 206 described in the above embodiment has been described using the CIECAM02. However, the present invention is not limited to this. For example, other color balance correction methods may be used as long as they are executed using the HL color of an image or reference white point.

An input image is not limited to an image shot by a digital camera. An image obtained by converting a digital image input from, for example, a digital camera into that having a display or print resolution may be used as an input image to execute the above processing.

In the above description, the sRGB color space is used as a work color space of an input image and processing. However, the present invention is not limited to this. For example, an AdobeRGB (trademark of Adobe Systems, U.S.A.) color space may be used as a work color space, or other color spaces such as a CIE L*a*b* space may be used.

The object detection has been described using a human face region. However, the present invention is not limited to this. For example, objects to be detected may be animals, buildings, and the like, and such modification is included within the scope of the present invention.

The present invention may be applied to either a system configured by a plurality of devices (for example, a host computer, interface device, reader, and printer), or an apparatus including a single device (for example, a printer, copying machine, or facsimile apparatus).

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-162215, filed Jul. 16, 2010, which is hereby incorporated by reference herein in its entirety.

What is claimed is:

1. An image processing apparatus for applying a color balance correction to input image data, comprising:
   a first highlight color calculation unit which estimates a light source at the time of shooting from pixel values of the image data and calculates a first highlight color based on the estimated light source at the time of shooting;
   a second highlight color calculation unit which calculates a second highlight color from the image data;
   a third highlight color calculation unit which calculates a third highlight color based on a position between the first highlight color and the second highlight color on a color space; and
   a correction unit which attains the color balance correction by converting the pixel values of the image data using the third highlight color.

2. The apparatus according to claim 1, wherein said first highlight color calculation unit further comprises:
   an object detection unit which detects an object included in the image data;
   an object color calculation unit which calculates an object color as a color value of the object; and
   a first highlight color determination unit which estimates a color temperature of the light source at the time of shooting using a gray color value and the object color in the image data, and determines the first highlight color from a color value of the image data at the estimated color temperature.

3. The apparatus according to claim 1, wherein said second highlight color calculation unit further comprises:
   a histogram calculation unit which calculates a histogram by accumulating luminance components of the image data; and
   a second highlight color determination unit which determines the second highlight color using a luminance value, an accumulated frequency in the histogram of which exceeds a predetermined value.

4. The apparatus according to claim 1, wherein said third highlight color calculation unit calculates a value of the third highlight color by internally dividing a value of the first highlight color and a value of the second highlight color on the color space using weighting coefficients.

5. The apparatus according to claim 4, wherein the weighting coefficients assume predetermined values.

6. The apparatus according to claim 4, wherein the weighting coefficients are determined according to differences from a reference value in respective processes of said first highlight color calculation unit and said second highlight color calculation unit.

7. The apparatus according to claim 2, wherein said third highlight color calculation unit further comprises:
   a highlight color candidate calculation unit which calculates a plurality of highlight color candidates using the first highlight color and the second highlight color;
   a candidate correction unit which applies the color balance correction to the object color using each of the plurality of highlight color candidates;
   a distance calculation unit which calculates a distance on the color space between each of the object colors after the color balance correction by said candidate correction unit and an ideal object color which is held in advance; and
   a third highlight color determination unit which determines, as the third highlight color, a highlight color candidate corresponding to the shortest distance of the distances calculated by said distance calculation unit.

8. The apparatus according to claim 1, wherein the color balance correction by said correction unit is nonlinear processing.

9. The apparatus according to claim 1, wherein the color balance correction by said correction unit uses CIECAM02.

10. An image processing method for applying a color balance correction to input image data, comprising:
    using at least one processor to perform the following:
    a first highlight color calculation step of estimating a light source at the time of shooting from pixel values of the image data and calculating a first highlight color based on the estimated light source at the time of shooting;
    a second highlight color calculation step of calculating a second highlight color from the image data;
    a third highlight color calculation step of calculating a third highlight color based on a position between the first highlight color and the second highlight color on a color space; and
    a correction step of attaining the color balance correction by converting the pixel values of the image data using the third highlight color.

11. A non-transitory computer-readable medium storing a program for controlling a computer to function as an image processing apparatus according to claim 1.

12. An image processing apparatus comprising:
    a first highlight color calculation unit which estimates a light source at the time of shooting of an image and calculates a first highlight color based on the estimated light source at the time of shooting;
    a second highlight color calculation unit which calculates a second highlight color from the image;
    a third highlight color calculation unit which calculates a third highlight color using the first highlight color and the second highlight color; and
    a correction unit which corrects a color balance of the image using the third highlight color.

13. The apparatus according to claim 12, wherein the first highlight color calculation unit calculates the first highlight color corresponding to a color temperature of the estimated light source at the time of shooting.

14. The apparatus according to claim 12, wherein the first highlight color calculation unit estimates the light source at the time of shooting using a color value of gray of the image and a color of an object included in the image.

15. The apparatus according to claim 12, wherein the second highlight color calculation unit calculates the second highlight color based on a histogram of luminance components of the image.

16. The apparatus according to claim 12, wherein the third highlight color calculation unit calculates a value of the third highlight color by internally dividing a value of the first highlight color and a value of the second highlight color using weighting coefficients.

17. The apparatus according to claim 12, wherein the third highlight color calculation unit calculates a value of the third highlight color by calculating a weighting coefficients using a color of an object included in the image and weighting a value of the first highlight color and a value of the second highlight color using the weighting coefficients.

18. The apparatus according to claim 12, wherein the third highlight color calculation unit further comprises:
    a highlight color candidate calculation unit which calculates a plurality of highlight color candidates by weighting a value of the first highlight color and a value of the second highlight color using a plurality of weighting coefficients;
    a candidate correction unit which applies the color balance correction to an object included in the image using each of the plurality of highlight color candidates; and
    a calculation unit which calculates the third highlight color based on a plurality of colors of the object applied the color balance correction by the candidate correction unit and a color of the object held in advance.

19. The apparatus according to claim 12, wherein the color balance correction by said correction unit uses CIECAM02.

20. An image processing method comprising:
    using at least one processor to perform the following:
    a first highlight color calculation step of estimating a light source at the time of shooting of an image and calculating a first highlight color based on the estimated light source at the time of shooting;
    a second highlight color calculation step of calculating a second highlight color from the image;
    a third highlight color calculation step of calculating a third highlight color using the first highlight color and the second highlight color; and
    a correction step of correcting a color balance of the image using the third highlight color.

21. A non-transitory computer-readable medium storing a program for controlling a computer to function as an image processing apparatus according to claim 12.

\* \* \* \* \*